US009496081B2

United States Patent
Norconk et al.

(10) Patent No.: US 9,496,081 B2
(45) Date of Patent: Nov. 15, 2016

(54) COUNTER WOUND INDUCTIVE POWER SUPPLY

(75) Inventors: Matthew J. Norconk, Grand Rapids, MI (US); Joshua K. Schwannecke, Grand Rapids, MI (US); David W. Baarman, Fennville, MI (US); Neil W. Kuyvenhoven, Ada, MI (US); Benjamin C. Moes, Wyoming, MI (US); Colin J. Moore, Lowell, MI (US)

(73) Assignee: Access Business Group International LLC, Ada, MI (US)

( * ) Notice: Subject to any disclaimer, the term of this patent is extended or adjusted under 35 U.S.C. 154(b) by 930 days.

(21) Appl. No.: 13/441,201

(22) Filed: Apr. 6, 2012

(65) Prior Publication Data

US 2013/0093252 A1 Apr. 18, 2013

Related U.S. Application Data

(60) Provisional application No. 61/501,458, filed on Jun. 27, 2011, provisional application No. 61/479,926, filed on Apr. 28, 2011, provisional application No. 61/473,515, filed on Apr. 8, 2011.

(51) Int. Cl.
*H02J 7/00* (2006.01)
*H01F 38/14* (2006.01)
(Continued)

(52) U.S. Cl.
CPC .............. *H01F 38/14* (2013.01); *B60L 11/005* (2013.01); *B60L 11/182* (2013.01);
(Continued)

(58) Field of Classification Search
CPC .......... H01F 38/00; H01F 37/00; H02J 7/00; H02J 7/02
USPC ........................................................ 307/104
See application file for complete search history.

(56) References Cited

U.S. PATENT DOCUMENTS 5,175,480 A * 12/1992 McKeefery .......... G05D 1/0265
                                                180/168
6,212,430 B1    4/2001 Kung
(Continued)

FOREIGN PATENT DOCUMENTS

EP        0298707      9/1994
JP        H08-241824   9/1996
(Continued)

OTHER PUBLICATIONS

Eberhard Waffenschmidt and Toine Staring, "Limitation of inductive power transfer for consumer applications", Submitted as synopsis to European Power Electronics (EPE) Conference 2009, Barcelona, Spain, Sep. 8-10, 2009.

(Continued)

*Primary Examiner* — Rexford Barnie
*Assistant Examiner* — Joseph Inge
(74) *Attorney, Agent, or Firm* — Warner Norcross & Judd LLP

(57) ABSTRACT

A contactless power supply is provided. The contactless power supply includes two or more primary coils for generating a region of cooperative magnetic flux generally therebetween. A portable device having a secondary coil can be positioned proximate this region of magnetic flux to receive wireless power from the contactless power supply. The spaced-apart primary coils can be wound in alternating directions about a common axis and driven in phase, or can be wound in a single direction about a common axis and driven approximately 180 degrees out of phase. The contactless power supply can include a plurality of primary coils in an adjustable array to accommodate multiple portable devices each with different secondary configurations and power consumption needs.

37 Claims, 20 Drawing Sheets

(51) Int. Cl.
  *B60L 11/00* (2006.01)
  *B60L 11/18* (2006.01)
  *H02J 5/00* (2016.01)
  *H02J 7/02* (2016.01)
  *H04B 5/00* (2006.01)

(52) U.S. Cl.
  CPC ....... *B60L 11/1805* (2013.01); *B60L 11/1833* (2013.01); *H02J 5/005* (2013.01); *H02J 7/025* (2013.01); *H04B 5/0037* (2013.01); *H04B 5/0087* (2013.01); *B60L 2200/20* (2013.01); *B60L 2210/30* (2013.01); *B60L 2210/40* (2013.01); *Y02T 10/7005* (2013.01); *Y02T 10/7022* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | |
|---|---|---|---|
| 6,480,110 B2 * | 11/2002 | Lee | G06K 19/0672 340/572.5 |
| 6,650,213 B1 | 11/2003 | Sakurai et al. | |
| 7,522,878 B2 | 4/2009 | Baarman | |
| 7,525,283 B2 | 4/2009 | Cheng et al. | |
| 7,622,891 B2 | 11/2009 | Cheng et al. | |
| 2004/0145342 A1 | 7/2004 | Lyon | |
| 2004/0189422 A1 | 9/2004 | De Bhailis et al. | |
| 2006/0202665 A1 * | 9/2006 | Hsu | H02J 7/025 320/139 |
| 2007/0145830 A1 | 6/2007 | Lee et al. | |
| 2008/0067874 A1 * | 3/2008 | Tseng | A61C 17/224 307/104 |
| 2008/0191638 A1 | 8/2008 | Kuennen et al. | |
| 2009/0015197 A1 * | 1/2009 | Sogabe | H02J 7/0011 320/108 |
| 2010/0130096 A1 * | 5/2010 | Baarman | A63H 17/26 446/444 |
| 2010/0314947 A1 | 12/2010 | Baarman et al. | |
| 2011/0018359 A1 * | 1/2011 | Wada | B63L 11/182 307/104 |
| 2011/0025133 A1 | 2/2011 | Sauerlaender et al. | |
| 2011/0043048 A1 * | 2/2011 | Karalis | B60L 11/182 307/104 |
| 2012/0026724 A1 * | 2/2012 | Metcalf | A47B 21/00 362/127 |
| 2013/0093253 A1 | 4/2013 | Norconk et al. | |

FOREIGN PATENT DOCUMENTS

| | | |
|---|---|---|
| JP | H11-122146 | 4/1999 |
| JP | 2009-022126 | 1/2009 |
| JP | 2009-508331 | 2/2009 |
| JP | 2009-171070 | 7/2009 |
| JP | 2011-049230 | 3/2011 |
| JP | 2011-003947 | 11/2011 |
| SE | 8704910 | 6/1989 |
| WO | 03/096512 | 11/2003 |
| WO | WO 2009/027674 | 3/2009 |
| WO | WO 2009/081126 | 7/2009 |
| WO | WO 2010059884 | 5/2010 |

OTHER PUBLICATIONS

Xun Liu, S. Y. Ron Hui, "Equivalent Circuit Modeling of a Multilayer Planar Winding Array Structure for Use in a Universal Contactless Battery Charging Platform", IEEE Transactions on Power Electronics, vol. 22, No. 1, Jan. 2007, p. 21.

International Search Report and Written Opinion for Application No. PCT/US20121032450 mailed Sep. 11, 2012.

Aristeidis Karalis, J.D. Joannopoulos, Mahn Soljacic, "Efficient Wireless Non-radiative Mid-Range Energy Transfer," Annals of Physics 323 (2008) 34-48.

Office Action for U.S. Appl. No. 13/441,207, filed Apr. 6, 2012, mailed Nov. 6, 2015.

Office Action for U.S. Appl. No. 13/441,207, filed Apr. 6, 2012, mailed May 27, 2016.

* cited by examiner

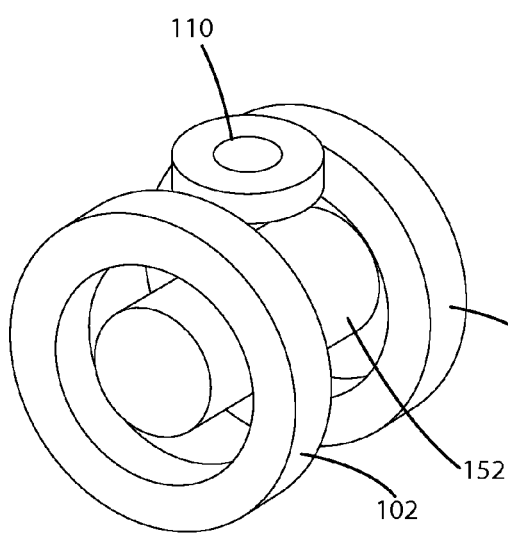
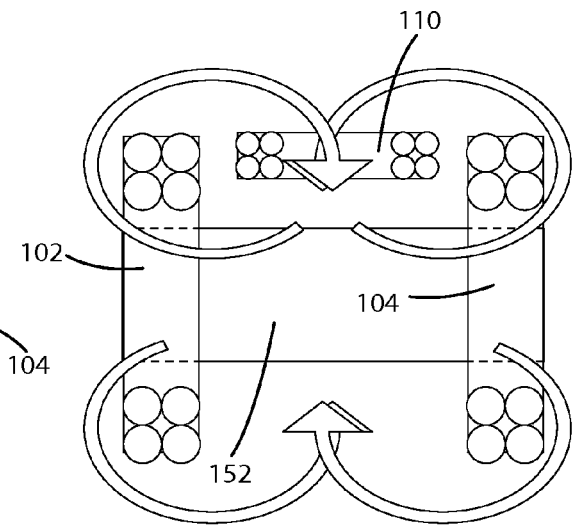
Fig. 13A　　　　　　　　Fig. 13B
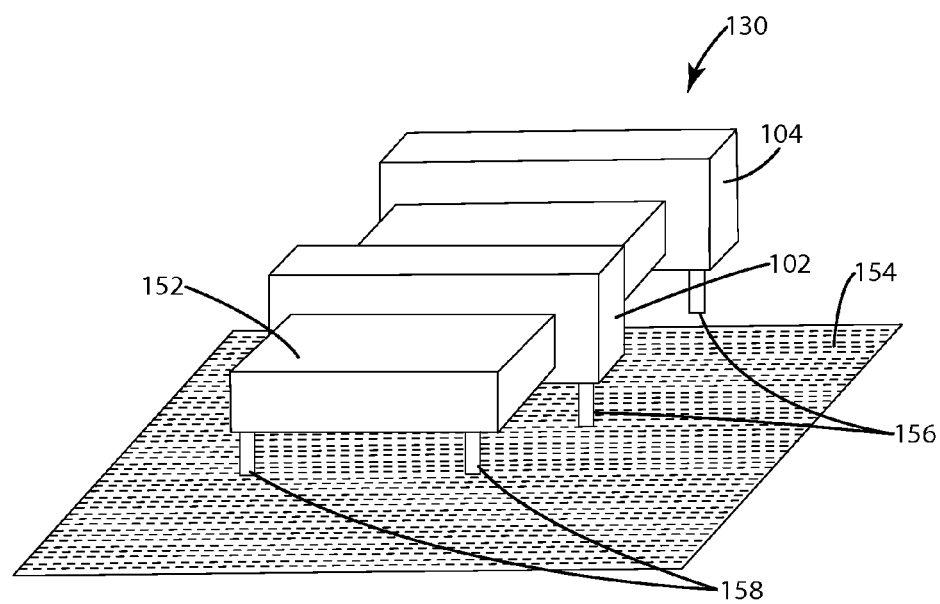
Fig. 14

COUNTER WOUND INDUCTIVE POWER SUPPLY

BACKGROUND OF THE INVENTION

The present invention relates to power supplies and more particularly to contactless power supplies capable of supplying power to a variety of portable devices.

Contactless power supplies transfer electrical energy to one or more portable devices without mechanical connection. A typical contactless power supply drives a time-varying current through a primary coil to create a time-varying electromagnetic field. One or more portable devices can each include a secondary coil. When the secondary coil is placed in proximity to the time-varying electromagnetic field, the field induces an alternating current in the secondary coil, thereby transferring power from the contactless power supply to the portable device.

In order to increase the power transfer from the contactless power supply to the portable device, it is generally desirable to increase the coupling coefficient between the primary coil and the secondary coil. At the same time, it can be desirable to provide power to the secondary coil across multiple positions and orientations with respect to the primary coil. These goals are often in tension. That is, achieving a high coupling coefficient can confine the portable device to a single location on the contactless power supply, while maximizing spatial freedom can lower the coupling coefficient, and therefore the power transfer, to undesirable levels.

Stated somewhat differently, contactless power systems using coupled electromagnetic fields have become increasingly common in commercial applications. It has been demonstrated that the efficiency of any system that transfers power through inductively coupled coils is inversely proportional to the spatial separation between the center point planes of those coils. However, the non-trivial expectation of spatial freedom of subsystem placement while maintaining efficient energy transfer between the coils of the transmitter and receiver subsystems has become a major focus area of this technology. Achieving this challenge has been a major topic of contactless power systems research. Approaches by some researchers allow the perception of arbitrary positioning through the selective combination of small coils. This approach can require a significant number of coils and corresponding control electronics to supply power to an arbitrarily large area. Another approach delivers power to an arbitrarily large area but can require inductors of very high Quality Factor. Furthermore, this type of system solution can be difficult to control in the transfer of energy into arbitrary devices that are in the transmitter-generated field.

A number of additional contactless power supplies have attempted to provide some degree of spatial freedom to the portable device, while also maintaining an acceptable coupling coefficient between primary and secondary coils. For example, one known contactless power supply includes an array of vertically-oriented primary coils in parallel alignment with one another. That is, the primary coils are oriented in side-by-side relationship with corresponding central axes being perpendicular to a power transfer surface. An orthogonal secondary coil can be positioned lengthwise above first and second primary coils in the array, having a central axis parallel to the power transfer surface. The first primary coil can be energized with a first polarity, while the second primary coil can be energized with a second polarity. The two primary coils generate a cooperative magnetic flux in the region occupied by the secondary coil. If the portable device is moved along the contactless power supply, one or more different primary coils can be energized to again provide two underlying primary coils having an opposite polarity.

Despite the advantages of the above system, such an array can be expensive to manufacture, and can include a high-profile cross-section depending on the height of each primary coil in the array. In addition, the process of winding and assembling an array of primary coils in this arrangement can be cost prohibitive in some applications. Accordingly, there remains a continued need for an improved contactless power supply for providing power to one or more portable devices. In addition, there remains a continued need for a low-cost contactless power supply to supply power to one or more portable devices across multiple positions and orientations on a power transfer surface.

SUMMARY OF THE INVENTION

A contactless power supply with two or more coaxial and spaced-apart primary coils for generating a region of cooperative magnetic flux therebetween. A portable device having a secondary coil can be positioned proximate this region of cooperative magnetic flux to receive wireless power from the contactless power supply. The spaced-apart primary coils can be wound in alternating directions about a common axis and driven in phase, or can be wound in a single direction about a common axis and driven approximately 180 degrees out of phase from one another, for example.

In one embodiment, the contactless power supply includes first and second primary coils wound from a single, counter wound electrical conductor. The first primary coil can be wound one or more turns in a first direction, and the second primary coil can be wound one or more turns in a second direction, with each coil being wound about a common axis. The first and second primary coils can be spaced-apart from each other to define a power transfer region generally therebetween. The first and second coils cooperate to provide a cumulative magnetic flux in the region between the first and second coils when driven by a time-varying current.

In another embodiment, the contactless power supply includes first and second primary coils wound about a common axis and in a common direction to define a power transfer region generally therebetween. The first and second primary coils can each be electrically connected to a power supply. The power supply can drive the first and second primary coils approximately 180 degrees out of phase with each other to provide a cooperative magnetic flux in the region generally between the first and second primary coils. For example, the first and second primary coils may be connected to the same driver but with opposite polarity, or may be connected to separate drivers.

In yet another embodiment, the contactless power supply includes a generally planar bobbin supporting a first plurality of primary coils spaced-apart from each other. At least two of the first plurality of primary coils can be selectively driven approximately 180 degrees out of phase from one another to provide a cumulative magnetic flux in the region generally between the primary coils. The planar bobbin can also support a second plurality of primary coils generally perpendicular to the first plurality of primary coils. If desired, at least two of the second plurality of primary coils can be selectively driven approximately 180 degrees out of phase from one another to provide a region of cumulative magnetic flux therebetween, optionally cooperating with the magnetic flux provided by the first plurality of primary coils.

In still another embodiment, a method is provided for forming a contactless power supply. The method includes winding a conductive element in a first direction for one or more turns to provide a first primary coil, winding the conductive element in a second direction for one or more turns to provide a second primary coil, and electrically connecting first and second end portions of the conductive element to a power supply. The power supply can drive the conductive element with a time-varying current to generate a magnetic flux in the region generally between oppositely-wound primary coils.

In another embodiment, a method is provided for forming a contactless power supply. The method includes winding a conductive element having first and second end portions for two or more turns, cutting the conductive element between adjacent turns to provide two separate primary coils, and electrically connecting the separate primary coils to a power supply but with opposite polarity or to separate power supplies operating 180 degrees out of phase from one another. The power supply or supplies can generate a time varying current in opposing directions through adjacent primary coils to generate a region of cooperative magnetic flux generally between the coils.

In another embodiment, a track segment for a toy vehicle is provided. The track segment includes first and second spaced-apart primary coils disposed adjacent to the track surface. The first and second primary coils can be driven in opposing directions to provide a region cooperative magnetic flux generally therebetween. The toy vehicle can include a secondary coil that is orthogonal with respect to the first and second primary coils. The secondary coil can provide power to an energy storage device, which can in turn provide power to an internal motor. The track segment can be looped in correspondence with the primary coils to provide continuous power to the toy vehicle regardless of its position on the track.

In still another embodiment, the contactless power supply includes a driving circuit adapted to selectively energize two or more primary coils to provide a magnetic flux in a region occupied by a portable device. The driving circuit is further adapted to detect an imbalanced current condition among the energized primary coils, and then drive the energized primary coils with substantially similar current values. The driving circuit can optionally adjust the rail voltage, the phase lag, the duty cycle, the driving frequency and/or the impedance among energized primary coils to achieve substantially similar current values among energized primary coils.

In yet another embodiment, the driving circuit includes a first adjustable rail voltage driver and a second adjustable rail voltage driver. The first driver can energize a first primary coil with a time-varying driving current, and the second driver can energize a second primary coil with a substantially identical time-varying driving current. The driving circuit can further include first and second current sensors to detect a divergence in current values among energized primary coils. The driving circuit can compensate for a detected divergence in current values by proportionally increasing or decreasing the output of one of the first and second drivers.

Embodiments of the invention can therefore provide an improved contactless power supply for supplying power to a portable device. By generating a cumulative magnetic flux in regions between primary coils, the contactless power supply provides improved power transfer to the portable device. The contactless power supply can also provide an adjustable array to provide spatial freedom and to accommodate portable devices with different secondary configurations. In addition, embodiments of the present invention can be manufactured at reduced costs when compared to existing methods. Embodiments of the present invention can also be sized as desired according to power transfer needs, and can include modular primary coil arrays for use with printed circuit boards and other devices.

These and other advantages and features of the invention will be more fully understood and appreciated by reference to the description of the current embodiments and the drawings.

BRIEF DESCRIPTION OF THE DRAWINGS

FIGS. 13A-13B are illustrations of a primary coil array including a magnetic core material.

FIG. 14 is an illustration of a modular primary coil array for a printed circuit board.

DESCRIPTION OF THE CURRENT EMBODIMENTS

The current embodiments relate to systems and methods for a contactless power supply. The systems generally include two or more spaced-apart primary coils for generating a region of cooperative magnetic flux generally therebetween. As explained below, the spaced-apart primary coils can be wound in alternating directions about a common axis and driven in phase, or can be wound in a single direction about a common axis and driven approximately 180 degrees out of phase from one another, for example.

I. First Embodiment

More specifically, and with reference to FIGS. 1-5, a contactless power supply in accordance with a first embodiment is shown and generally designated 100. While described in FIGS. 1-5 as pertaining to a looped track segment for a toy vehicle, it should be noted that the contactless power supply 100 is not limited to track segments, and can be adapted for across a wide variety of applications. For example, the contactless power supply 100 can be curved or planar, and can be sized to provide power to essentially any portable device having a secondary coil, including a mobile phone, a digital camera, a personal digital assistant, a tablet computer, a laptop computer or rechargeable battery pack, for example. As another example, an array of coils can be arranged together to form a large charging region.

Figure 1:
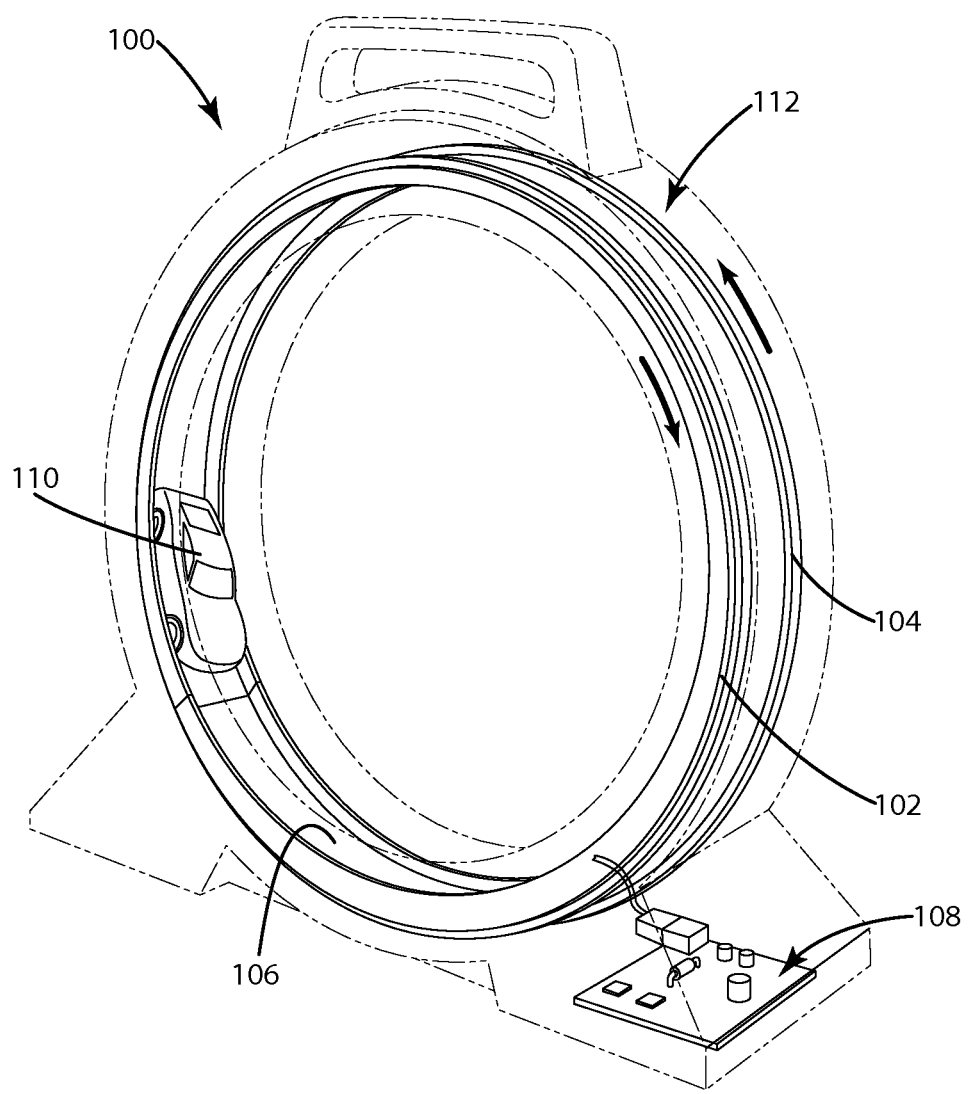
FIG. 1 is a perspective view of a contactless power supply.
Figure 2:
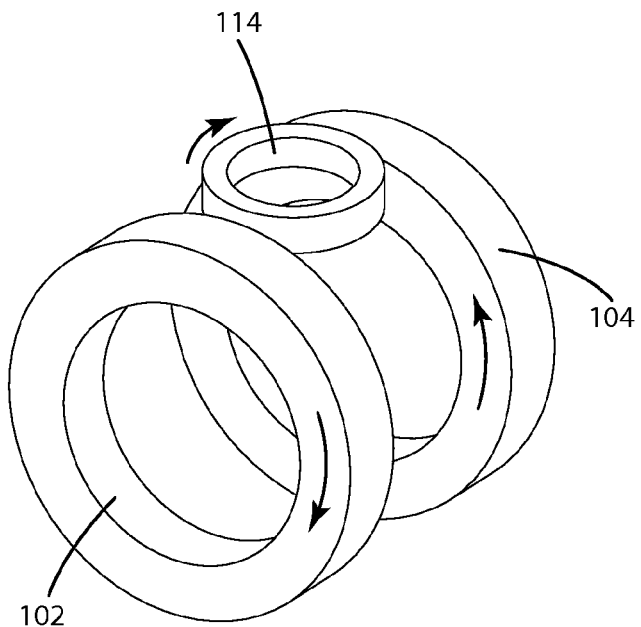
FIG. 2 is an illustration of first and second primary coils driven out of phase.

Referring now to FIGS. 1-5, the contactless power supply 100 for a looped track segment includes a first primary coil 102 and a second primary coil 104 disposed adjacent a power transfer surface 106. The first and second primary coils 102, 104 are spaced-apart and are electrically connected to a driving circuit 108. In addition, the first and second primary coils 102, 104 are generally co-axial. That is, the first and second primary coils 102, 104 are spaced apart end-to-end to generally define a common central axis. In order to generate a region of cooperative magnetic flux generally between the first and second primary coils 102, 104, the driving circuit 108 can drive the first primary coil 102 out of phase with respect to the second primary coil 104. For example, and as shown in FIG. 2, the driving circuit 108 can simultaneously drive the first primary coil 102 with current in a first direction and the second primary coil 104 with current in a second direction different from the first direction. As a result, the first and second primary coils 102, 104 cooperate to provide a cumulative magnetic flux in the region generally between the first and second primary coils 102, 104.

Figures 3A, 3B:
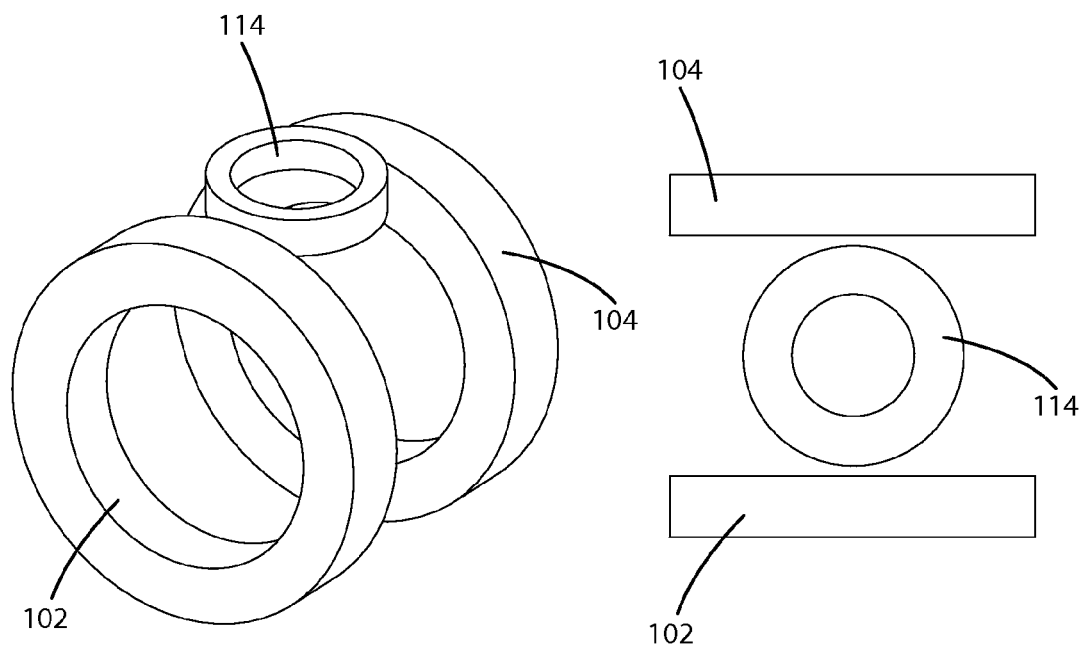
FIGS. 3A-3D are illustrations of first and second primary coils driven out of phase.
Figure 3C:
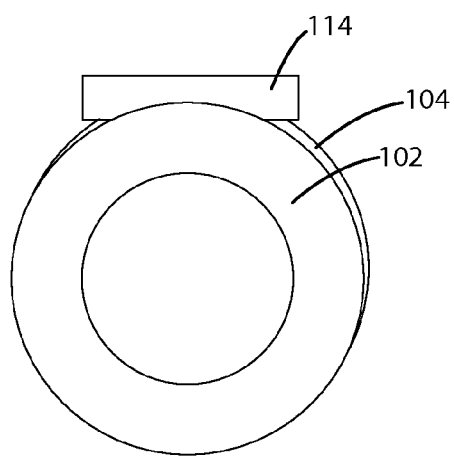
Figure 3D:
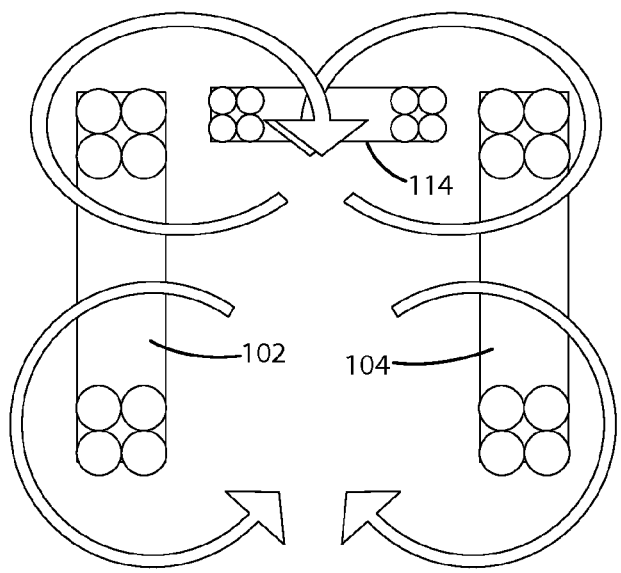
Figure 4:
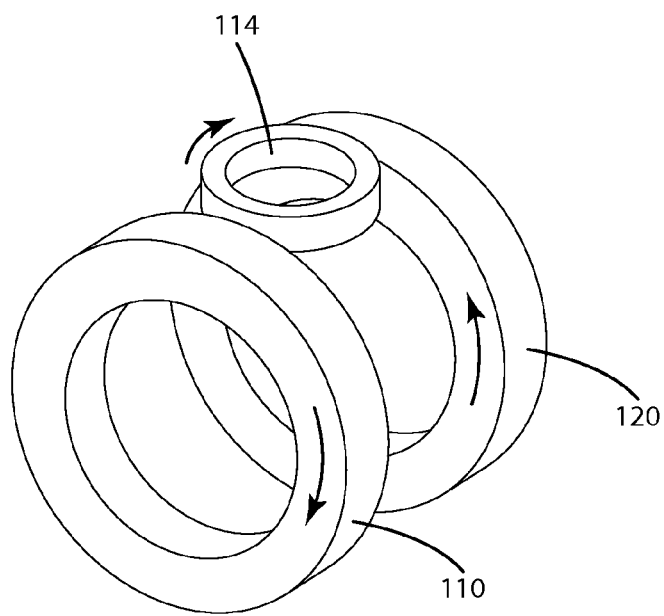
FIG. 4 is an illustration of first and second counter wound primary coils driven in phase.

The contactless power supply 100 can provide a source of wireless power for a portable device 110. The portable device 110 can include any device suitably adapted to receive wireless power. As shown in FIG. 1 for example, the portable device can include a toy vehicle 110 configured to orbit a looped track segment 112. The toy vehicle 110, or other portable device, can include a secondary coil 114 generally orthogonal to the first and second primary coils 102, 104. For example, the toy vehicle 110 can include a secondary coil 114 wound about an axis that extends at least partially through the region between the first and second primary coils 102, 104. While shown in FIGS. 2-4 as being generally orthogonal to the first and second primary coils 102, 104, the secondary coil 114 can be angled or canted with respect to the first and second primary coils 102, 104, having at least an orthogonal component. In some embodiments, only a portion of the secondary coil 114 is the region between the first and second primary coils 102, 104, where "between" the first and second primary coils as used herein includes areas above and below and the gap bounded by the first and second primary coils 102, 104, including the region above a power transfer surface 106. For example, the secondary coil 114 can be positioned to at least partially overlie one or more of primary coils 102, 104, while still including a portion that is between the primary coils 102, 104. In other embodiments, the secondary coil 114 can be positioned at least partially directly between the primary coils 102, 104 as shown in FIG. 2-4, wherein the primary coils 102, 104 are radially outward of the secondary coil 114. In addition, the secondary coil 114 can be offset from midway between the first and second primary coils 102, 104, being closer to the first primary coil 102 or the second primary coil 104, or being closer to a forward or reward portion of the primary coils 102, 104.

When a time-varying current in the first and second primary coils 102, 104 is driven in opposite directions, the cumulative magnetic flux from the first and second primary coils 102, 104 can induce a current in the secondary coil 114. For example, and as shown in FIG. 2, as the first primary coil 102 is driven with an increasing clockwise current, the secondary coil can generate an increasing orthogonal clockwise current. In addition, as the second primary coil 104 is driven with an increasing counter-clockwise current, the secondary coil can generate an additional increasing orthogonal clockwise current. Thus, the first and second primary coils 102, 104 cooperate to induce a cumulative current in the secondary coil 114. The secondary coil 114 can then provide power to a load. For example, the load can include an electric motor to provide a motive force for the toy vehicle 110. Alternatively, the secondary coil 114 can provide power to an energy storage device, such as a battery or a capacitor, which can in turn provide power to a load. The contactless power supply 100 can therefore provide a source of continuous power along substantially the entire driving surface 106 for toy vehicles positioned thereon.

As noted above, the contactless power supply 100 can include a driving circuit 108 to drive the first and second primary coils 102, 104 with a time varying current. The driving circuit 108 can include a single inverter to drive the first and second primary coils 102, 104, or can include two or more inverters to drive the first and second primary coils 102, 104. Where two or more inverters are utilized, a first inverter 122 can provide a first time-varying current to the first primary coil 102, and the second inverter 124 can provide a second time-varying current to the second primary coil 104, optionally sharing driving frequencies. If the first and second primary coils 102, 104 are wound in the same direction, the inverters 122 and 124 can drive the first and second primary coils 102, 104 approximately 180 degrees out of phase. If the first and second primary coils 102, 104 are counter wound, the inverter 126 or inverters 122 and 124 can drive the first and second primary coils 102, 104 approximately in phase.

Figure 5A:
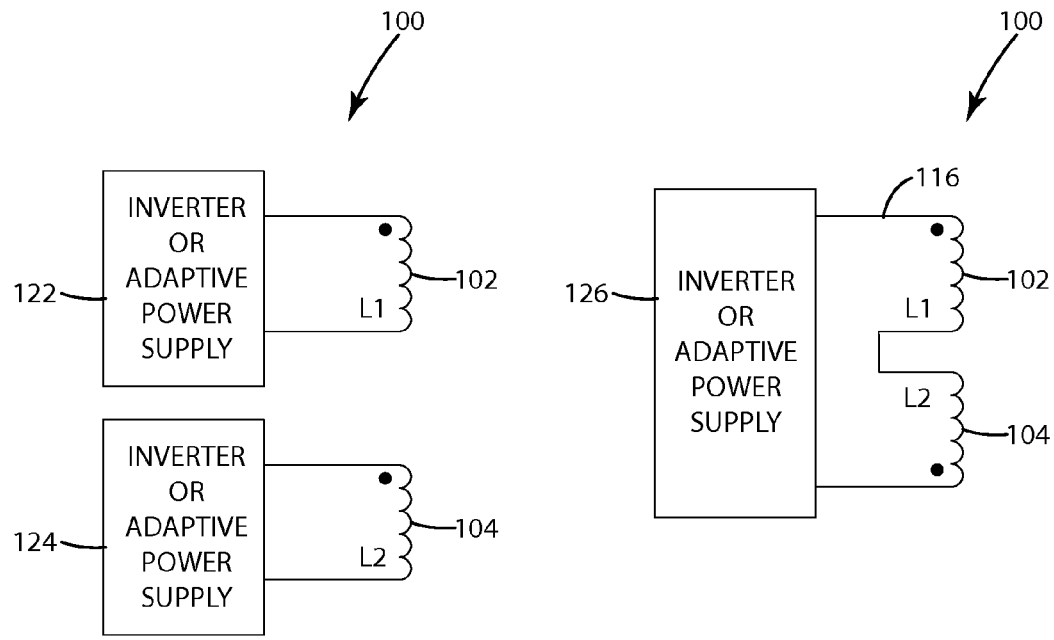
FIG. 5A are circuit diagrams of two primary coils driven out of phase and a counter wound primary coil driven in phase.
Figure 5B:
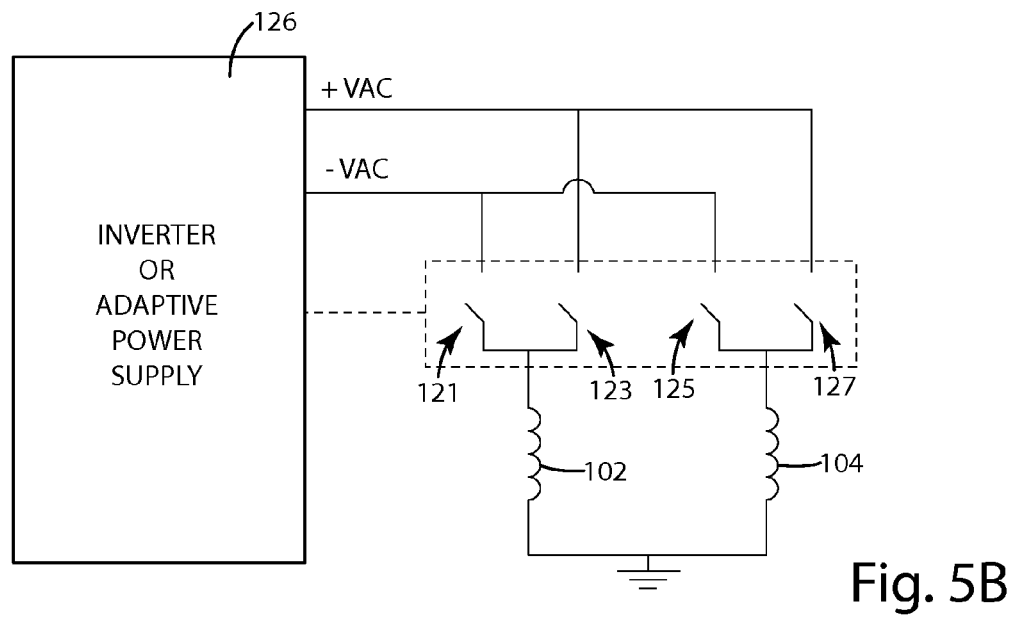
FIG. 5B is a circuit diagram including a single inverter for two primary coils.
Figure 5C:
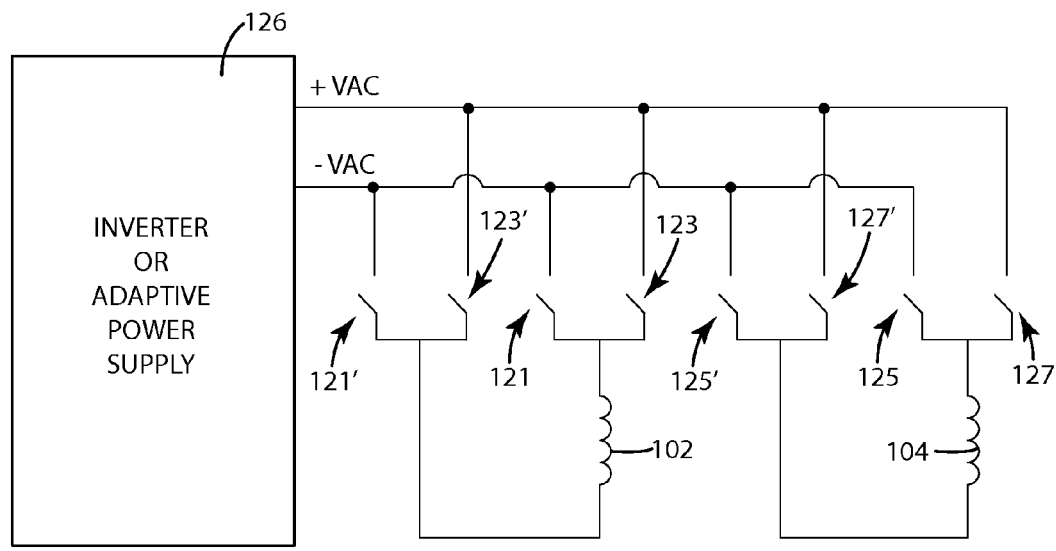
FIG. 5C is a circuit diagram including a single inverter for two primary coils.
Figure 6:
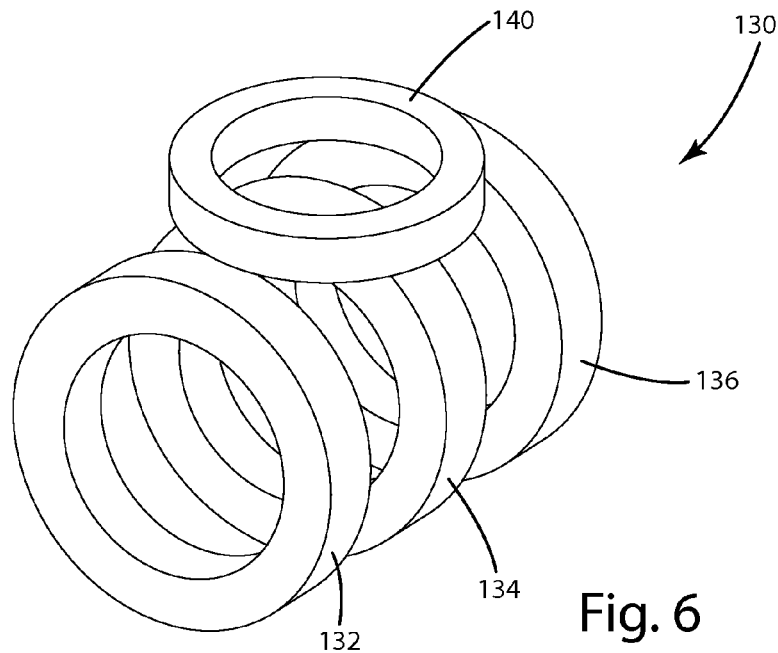
FIG. 6 is an illustration of multiple primary coils to collectively or individually induce current in an orthogonal secondary coil.

As an alternative to driving the primary coils 102, 104 with dedicated invertors 122, 124, the driving circuit 108 can include a single inverter 126 to provide a time-varying current to first and second counter wound primary coils 102, 104. For example, the counter wound primary coils 102, 104 can be connected in series as shown in FIG. 5A, or the counter wound primary coils 102, 104 can be connected in parallel but with an opposite polarity. As shown in FIGS. 5B-5C, the contactless power supply 100 can alternatively include multiple switches for driving the primary coils 102, 104 both in phase and out of phase. For example, if the primary coils 102, 104 are not counter wound, they can be driven out of phase by closing switches 123 and 125 while switches 121 and 127 remain open. If however the primary coils 102, 104 in FIG. 5B are counter wound, the primary coils 102, 104 can be driven in phase by closing switches 123 and 127 while switches 121 and 125 remain open. Similarly, the primary coils 102, 104 in FIG. 5C can be driven out of phase by closing switches 121, 123', 125' and 127, while the remaining switches remain open. The primary coils 102, 104 of FIG. 5C can be driven in phase by closing switches 121', 123, 125' and 127, while the remaining switches remain open. The switches can optionally be controlled by a microcontroller associated with the inverter 126 to rapidly search for one or more secondary coils 114 as more fully set forth below in connection with FIGS. 10-12. While shown with two primary coils 102, 104, these embodiments are well suited for use in supplying power to an array of three or more primary coils. For example, the inverter 126 can be used to selectively energize n-number of parallel-connected primary coils (a) to search for or to locate one or more portable devices and (b) to enhance power transfer between the array and the one or more portable devices. For example, additional primary coils can be electrically connected across +Vac and −Vac to provide an array of n-number of selectively energized primary coils.

II. Second Embodiment

Referring now to FIGS. 6-15, a contactless power supply 100 in accordance with a second embodiment includes a primary coil array 130 for inducing a current in one or more generally orthogonal secondary coils 140. The primary coil array 130 can include a plurality of primary coils 132, 134, 136 spaced-apart from each other and wound about a common axis and subjacent a power transfer surface for receipt of a remote device thereon. The primary coils 132, 134, 136 can be controlled individually or collectively to generate a cooperative magnetic flux in the region occupied by the remote device, and in particular, the secondary coil 140. In one embodiment, two primary coils 132 and 136 are selectively driven 180 degrees out of phase from one another to provide a cumulative magnetic flux therebetween while optionally shorting an intermediate primary coil 134. While only one intermediate coil 134 is shown, any number of intermediate coils can be included between the driven primary coils 132 and 136. For example, the primary coil array 130 can include n-number of primary coils, with between one and n-number of primary coils being driven to provide a region of magnetic flux.

Figure 7:
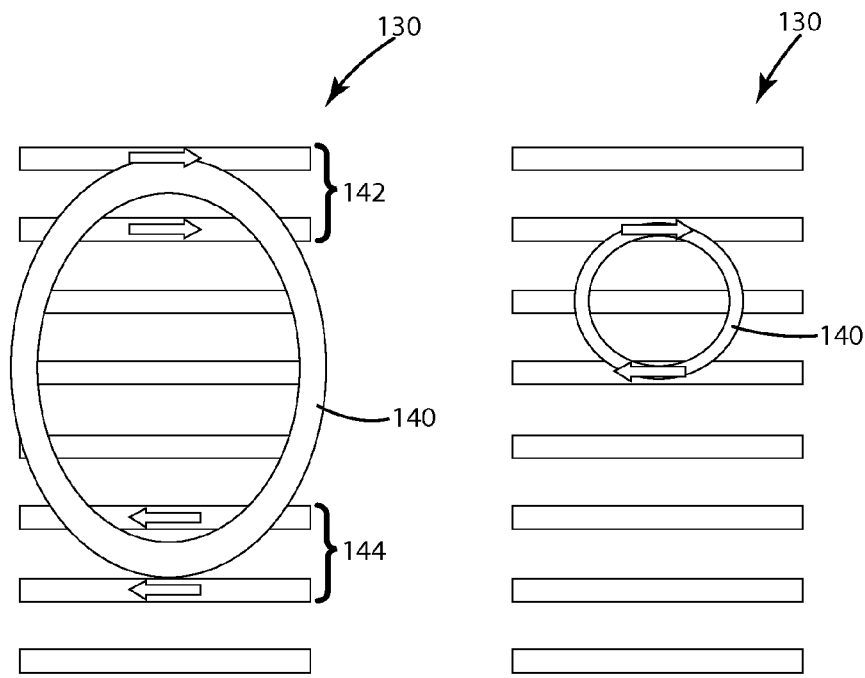
FIG. 7 is a schematic representation of a primary coil array.

As shown in FIG. 7, the activated primary coils can include those primary coils approximately tangentially aligned with the secondary coil 140. For example, a first plurality of primary coils 142 can be driven in phase to induce a current in the secondary coil 140, while a second plurality of primary coils 144 can be driven substantially out of phase to induce a current in the secondary coil 140. For example, the first and second primary coils can be driven approximately 180 degrees out of phase. The first and second plurality of primary coils 142, 144 can be spaced-apart from one another, and can cooperate to induce a clockwise or counter-clockwise current in the secondary coil 140. In this embodiment, the magnetic flux is localized to coincide with the portion of the secondary coil 140 tangentially aligned with the primary coils of the primary coil array 130. Thus, the primary coil array 130 is suitably adapted to provide power to multiple different-sized secondary coils. In addition, the primary coil array 130 affords one or more degrees of spatial freedom by simultaneously providing power to multiple secondary devices in multiple positions along the primary coil array 130.

Figure 8:
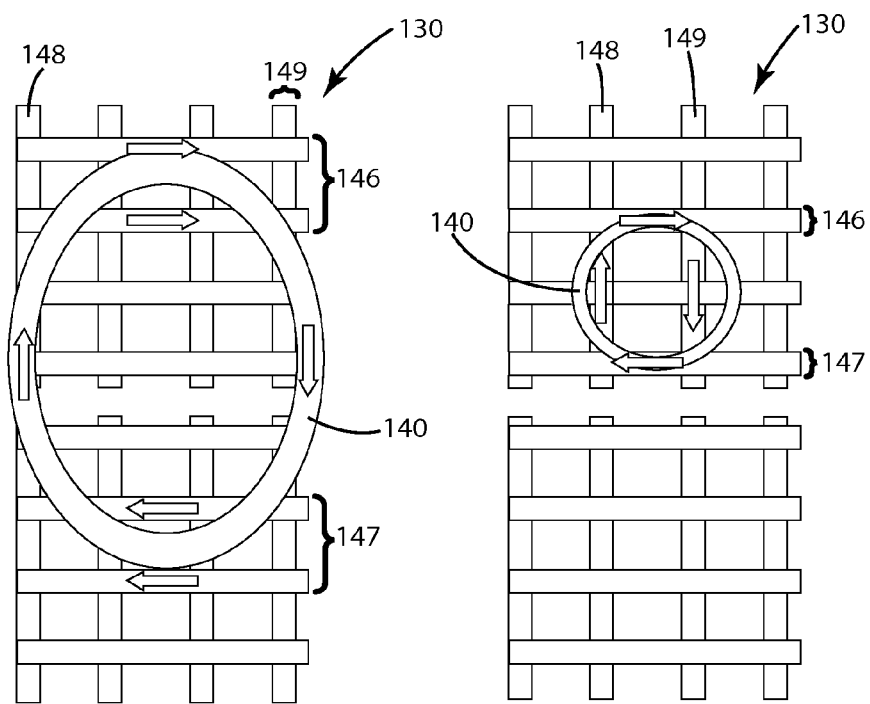
FIG. 8 is a schematic representation of a primary coil array having orthogonal primary coils.
Figure 9:
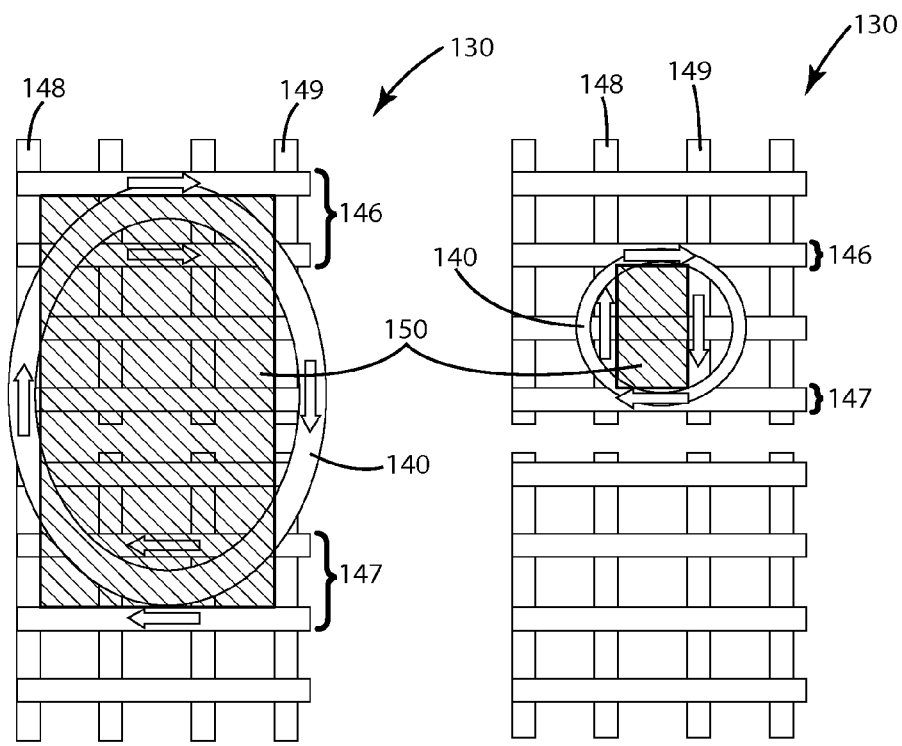
FIG. 9 is a schematic representation of the primary coil array of FIG. 8.

While described above as having a plurality of primary coils wound about a single axis, the primary coil array 130 can also include an additional plurality of primary coils wound about a second axis generally perpendicular to the first axis. As shown in FIGS. 8-9, the primary coil array 130 can include coils wound in orthogonal directions to more closely couple to a corresponding secondary coil 140. The activated primary coils can include those primary coils approximately tangentially aligned with the secondary coil 140. For example, the selected horizontal primary coils 146 and 147 can be driven in opposite directions to induce a current in the secondary coil 140, and the selected vertical primary coils 148 and 149 can be driven in opposite directions to induce a current in the secondary coil 140. The selected primary coils can be driven in phase if counter wound, or out of phase if wound in the same direction. Because only those primary coils tangentially aligned with the secondary coil 140 are energized, the contactless power supply 100 minimizes power losses from poorly coupled primary coils. As also shown in FIG. 9, the orthogonally-wound primary coils can contribute to an enclosed zone of flux 150 generally corresponding to the shape of the secondary coil 140. While the secondary coil 140 is shown as generally circular, the secondary coil 140 can be essentially any size and shape, including a curved configuration or a polygonal configuration, for example.

Figure 10:
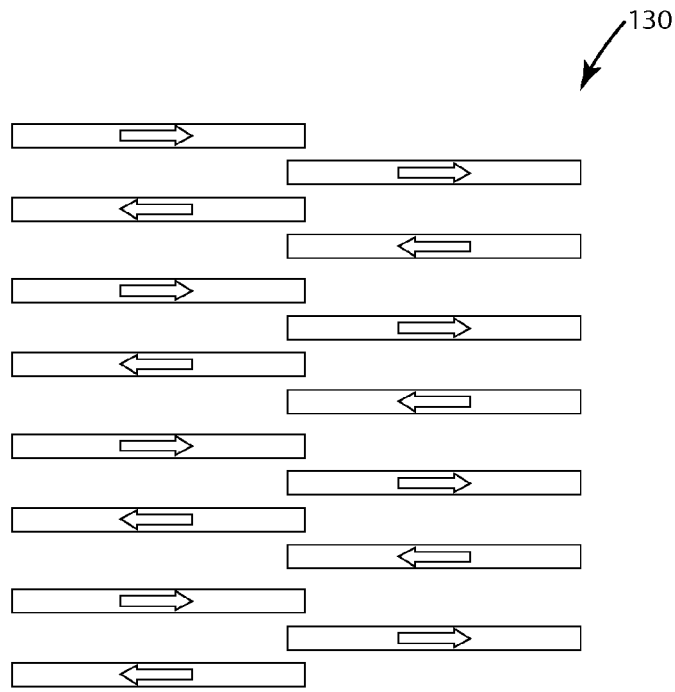
FIG. 10 is a schematic representation of a primary coil array illustrating a first method for locating a secondary coil.

In certain applications it can be desirable to identify the presence of one or more portable devices and to energize only those primary coils that are closely coupled with a secondary coil(s) contained within the portable device(s). This can be especially useful if the primary coil array 130 is adapted for use with a variety secondary coils each having different shapes, sizes or orientations, whether individually or simultaneously. As shown in FIG. 10, for example, a primary coil array can include first and second columns of coaxial primary coils. In order to identify the location of one or more secondary coils, the driving circuit 108 can simultaneously energize each primary coil in a direction opposite that of the adjacent primary coil. The adjacent primary coil can be driven in phase if counter wound, or can be driven out of phase if wound in the same direction. By monitoring the current, voltage and/or phase of each primary coil, the primary coils most closely aligned with the secondary coil 140 can be selected. For example, the selected primary coils can include those primary coil exhibiting at least a threshold current response. This can include two adjacent primary coils, two primary coils separated by intermediate primary coils, or a combination of the two. With the desired primary coils selected, the secondary coil 140 can be powered as substantially set forth above in connection with FIGS. 6-7.

Figure 11:
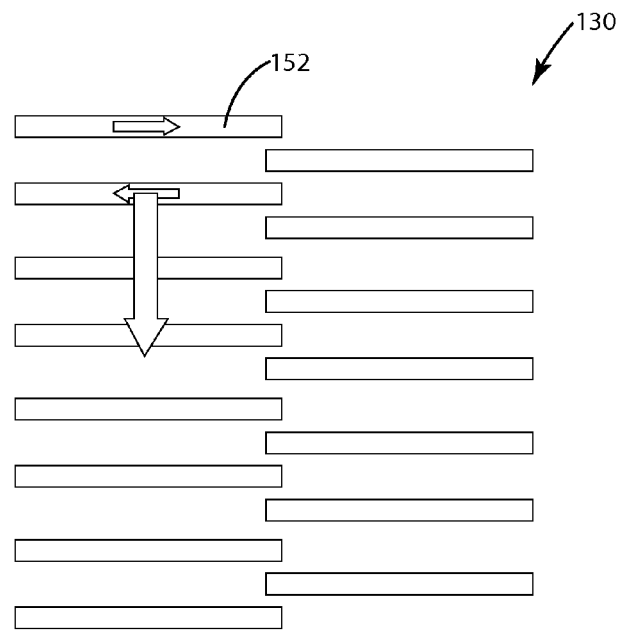
FIG. 11 is a schematic representation of a primary coil array illustrating a second method for locating a secondary coil.
Figure 12:
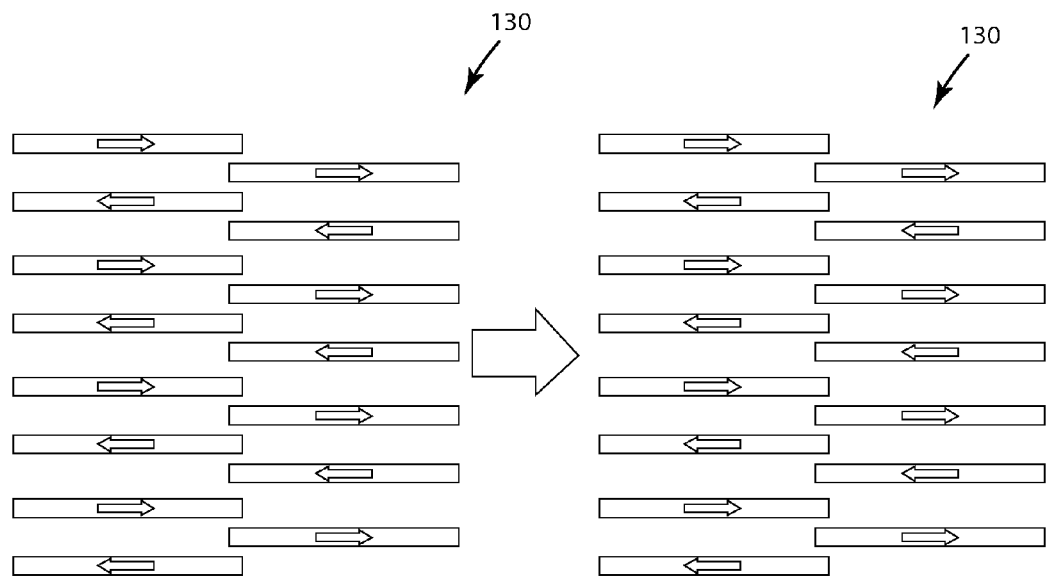
FIG. 12 is a schematic representation of a primary coil array illustrating a third method for locating a secondary coil.

Alternatively, and as shown in FIG. 11, a first primary coil 152 can be energized in a first direction, and some or all of the remaining primary coils can be sequentially energized in the opposite direction. As the flux area 150 gradually increases, the current, voltage and/or phase in the energized primary coil can vary. The primary coil(s) most closely aligned with the secondary coil 140 can be selected by monitoring the primary coil current, voltage or phase. For example, the selected primary coil can include the primary coil exhibiting at least a threshold current response. The identified primary coils can include adjacent primary coils, primary coils separated by intermediate primary coils, or combinations thereof. According to another method for locating a secondary coil 140, the primary coil array 130 can drive each primary coil in a direction opposite that of the adjacent primary coil. The primary coil array 130 repeats this process by driving the primary coils in pairs as shown in FIG. 12. For example, alternating pairings of primary coils can be driven in a first direction as the remaining pairings of primary coils are driven in a second direction. The primary coil most closely aligned with the secondary coil 140 can be selected by monitoring its current, voltage or phase. For example, the selected primary coil can include the primary coil exhibiting at least a threshold current response. As noted above, the identified primary coils can include adjacent primary coils, primary coils separated by intermediate primary coils, or combinations thereof.

Figure 15A:
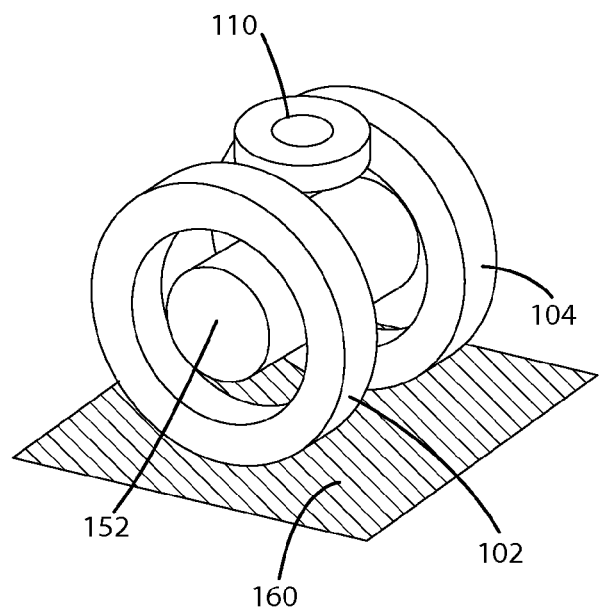
FIGS. 15A-15B are illustrations of a primary coil array including a diamagnetic material.
Figure 15B:
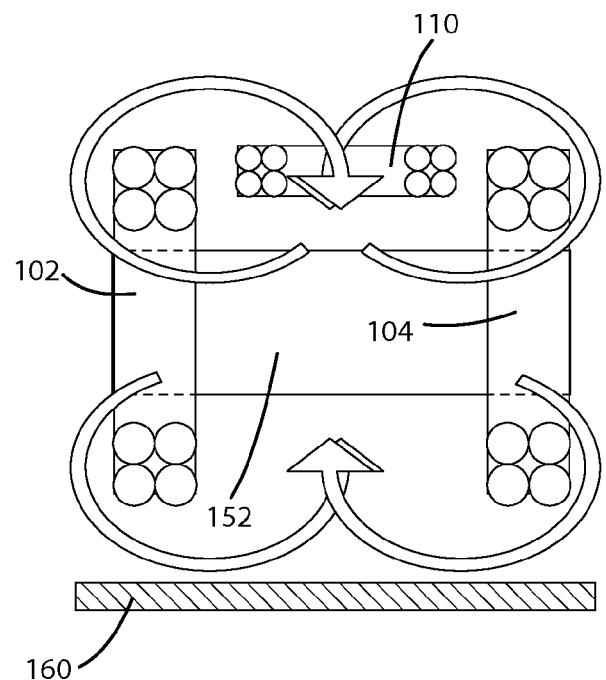
Figure 16:
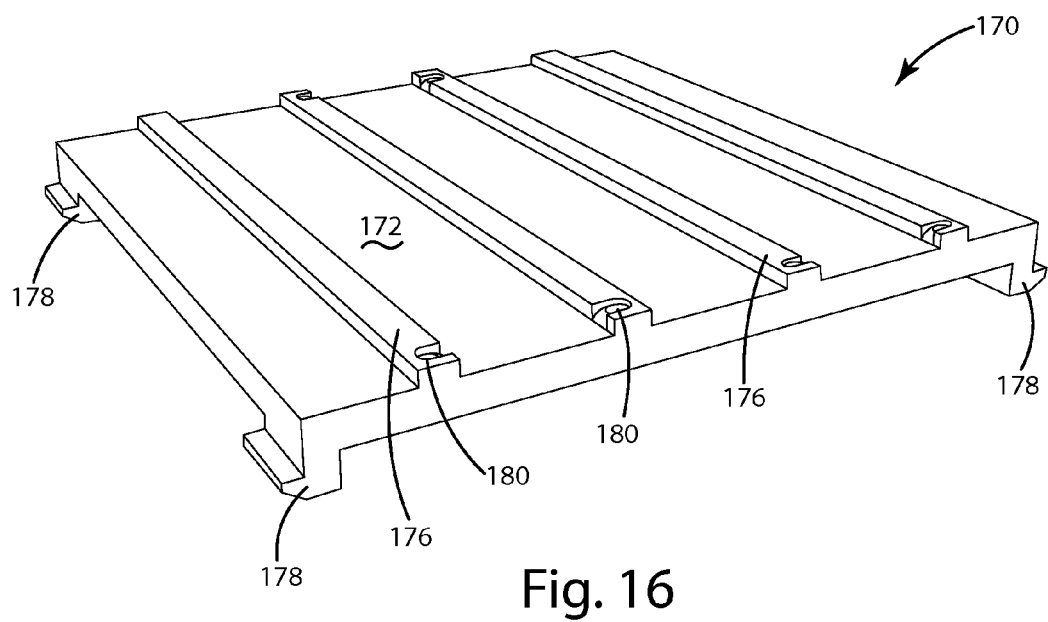
FIG. 16 is a perspective view of a bobbin for a primary coil array.
Figure 17:
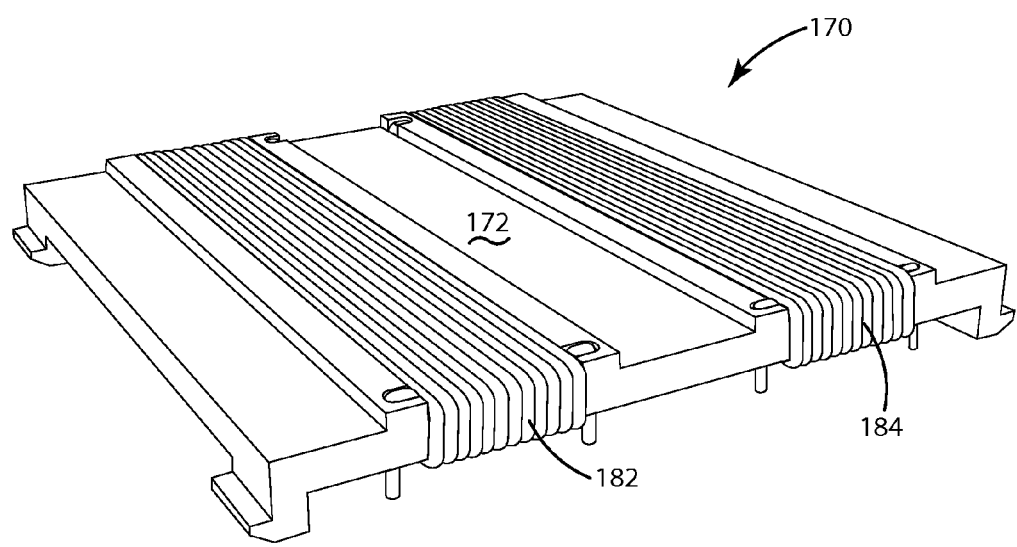
FIG. 17 is a perspective view of a two-coil primary coil array.

Embodiments can also include a variety of materials to shape or otherwise enhance the magnetic flux in the region generally between energized primary coils. As shown in FIGS. 13-14, for example, the primary coil array 130 can include a ferromagnetic material 152 extending at least partially through the core of adjacent primary coils 102, 104. As illustrated in FIG. 13B, the ferromagnetic material 152 can confine or guide the current-inducing magnetic flux lines downward through the secondary coil 110. The ferromagnetic material 152 can be any suitable shape, and can be cylindrical or generally planar, for example. In addition, the ferromagnetic material 152 can simultaneously function as a flux guide to reduce the interaction between the secondary coil 110 and any current-canceling flux from the underside of the primary coils array 130. That is, the ferromagnetic material 152 can guide the current-canceling flux from the underside of the primary coil array away 130 from the secondary coil 110 (and generally through the primary coils 102, 104) to not interfere with the current-inducing flux above the primary coil array 130. Alternatively, or in addition, a diamagnetic core material 152 can also be utilized to inhibit any current-canceling flux in the region occupied by the secondary coil 110. As shown in FIGS. 15A-15B, the contactless power supply 100 can also include one or more ferromagnetic or diamagnetic materials 160 to guide or inhibit magnetic flux, respectively, in regions where the secondary coil 110 is not present. The layer of ferromagnetic or diamagnetic material 160 can extend opposite the secondary coil 110. A diamagnetic material can include the suitable materials exhibiting primarily diamagnetic properties including copper and lead, for example. Alternatively, a diamagnetic material 160 can also include conductive materials that exhibit diamagnetic properties in the presence of an alternating electromagnetic field, including for example aluminum, bismuth pyrolytic graphite and superconducting materials. As noted below in connection with FIG. 23, the primary coil array 130 can also form a modular unit to be coupled to a circuit board 154 or other surface.

III. Third Embodiment

In addition to the embodiments described above, a further example of a primary coil array is shown in FIGS. 16-23 and generally designated 170. The primary coil array 170 can include a generally planar bobbin 172 and a plurality of primary coils 182, 184 spaced-apart from each other. A method for forming the primary coil array 170 can include winding a conductive element 174 about spaced-apart portions of the bobbin 172. The conductive element 174 can include a first primary coil 182 spaced-apart from a second primary coil 184. The first and second primary coils 182, 184 can be counter wound, or can be wound in the same direction. If counter wound, the first and second primary coils 182, 184 can be driven substantially in phase to generate a region of cooperative magnetic flux therebetween. If wound in the same direction, the conducting element 174 can be cut between the first and second primary coils 182, 184. Each primary coil 182, 184 can then be connected to an inverter and driven approximately 180 degrees out of phase. Alternatively, a cut end can be connected to a free end of an adjacent primary coil. The resulting series-connected primary coils 182, 184 can be driven with an alternating current substantially as though the primary coils 182, 184 were counter wound. Thus, the assembly of a primary coil array 170 can be greatly simplified by separating adjacent primary coils 182, 184 formed from a single conducting element 174. Rather than continuously reversing the direction of the conducting element 174 along the bobbin 172, the cut ends of each primary coil 182, 184 can be electrically connected to a driving circuit accordingly to a wide variety of configurations.

Figure 18:
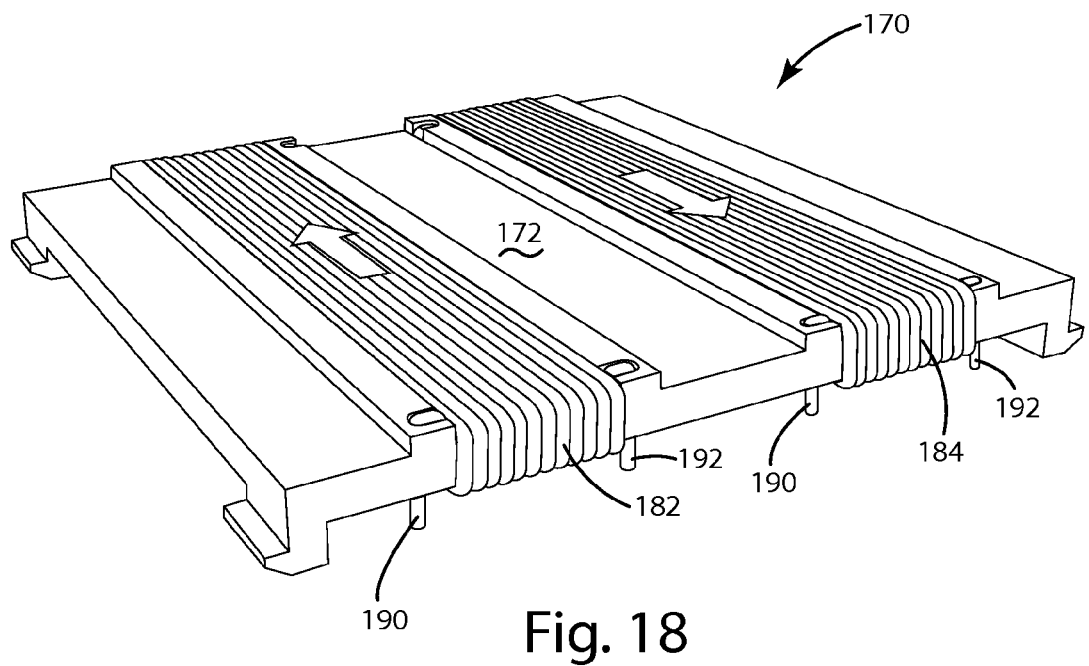
FIG. 18 is a perspective view of the two-coil primary coil array of FIG. 17.
Figure 19:
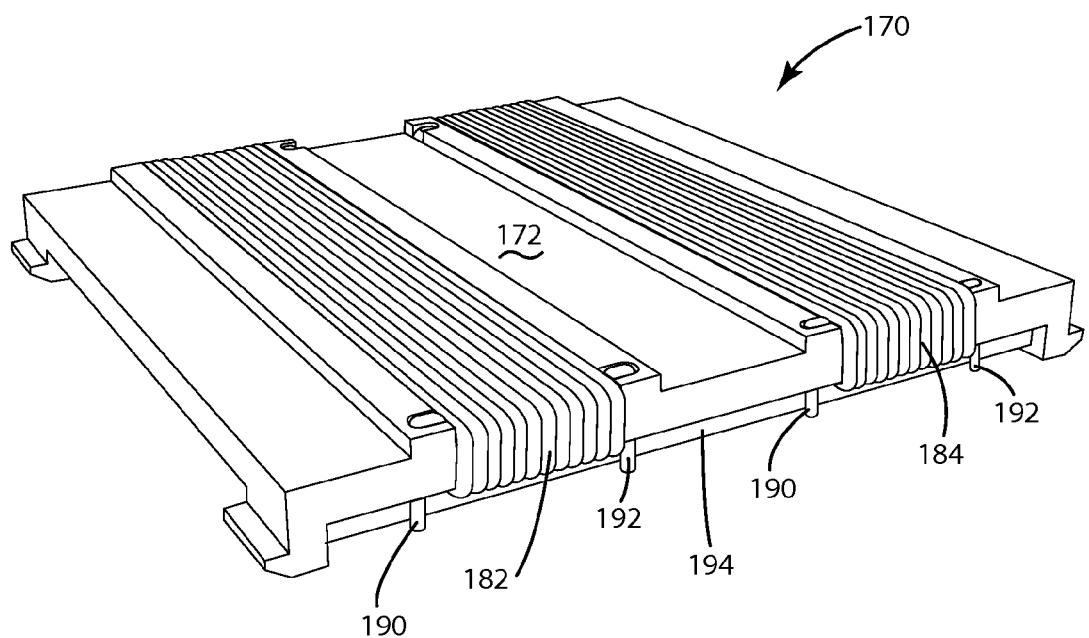
FIG. 19 is a perspective view of the two-coil primary coil array of FIG. 17 including a diamagnetic layer.
Figure 20:
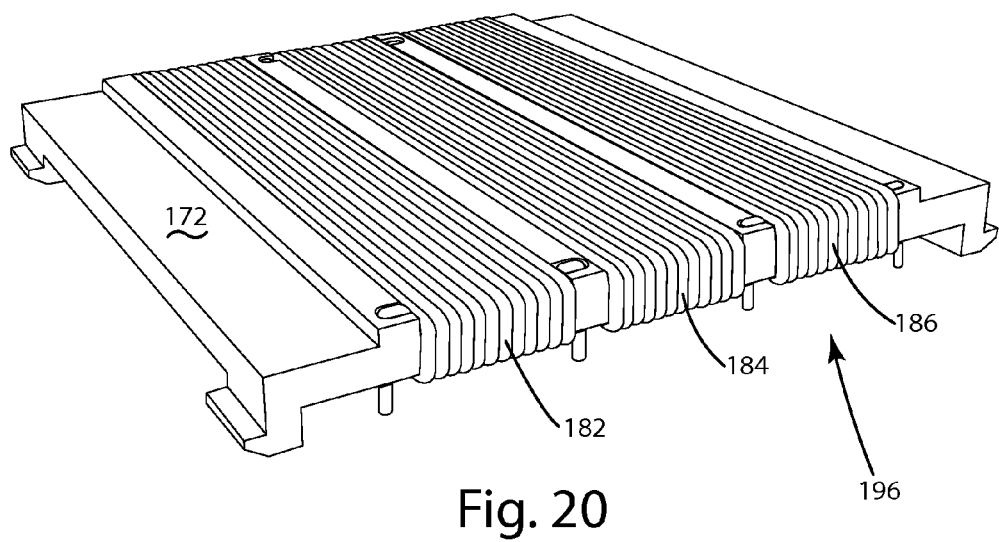
FIG. 20 is a perspective view of a three-coil primary coil array.

Referring again to FIGS. 16-23, the bobbin 172 can include one or more guides 176 to align adjacent primary coils within respective channels 177. In addition, the bobbin 172 can optionally include multiple fasteners 178 and multiple through-holes 180 to individually connect each primary coil 182, 184, 186 to a power supply. As shown in FIGS. 18-20, the primary coils 182, 184, 186 can each include first and second end portions 190, 192 that are guided through corresponding through-holes 182 in the bobbin 172. As shown in FIG. 19, the primary coil array 170 can include a layer of diamagnetic material 194 disposed between the bobbin 172 and as set forth above in connection with FIG. 15. Alternatively, or in addition, the underlying circuit board 196 can itself include a diamagnetic material to inhibit magnetic flux in the region beneath the circuit board 196.

Figure 21:
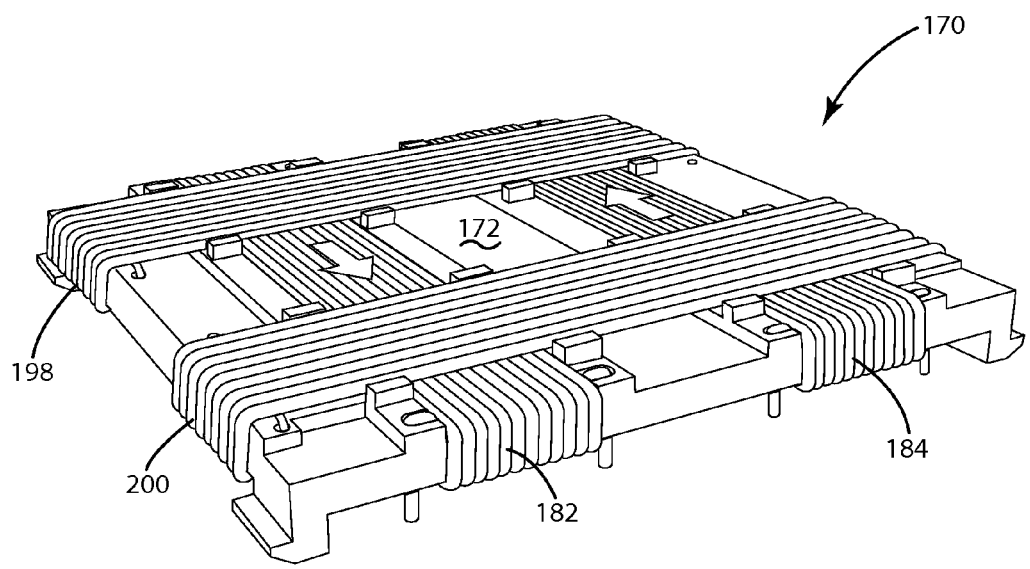
FIG. 21 is a perspective view of a four-coil multi-axis primary coil array.
Figure 22:
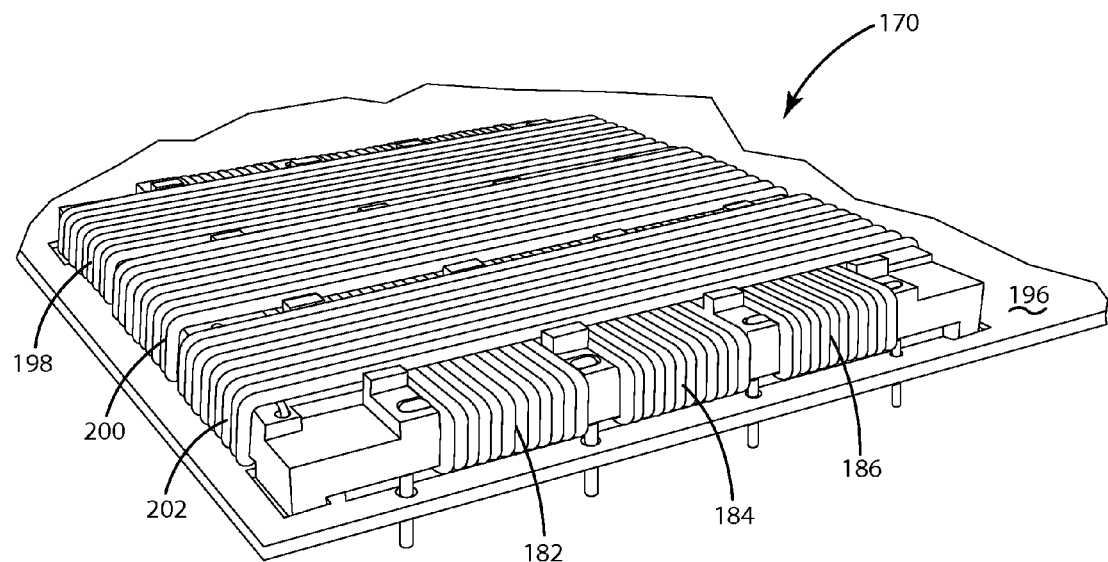
FIG. 22 is a perspective view of a six-coil multi-axis primary coil array.
Figure 23:
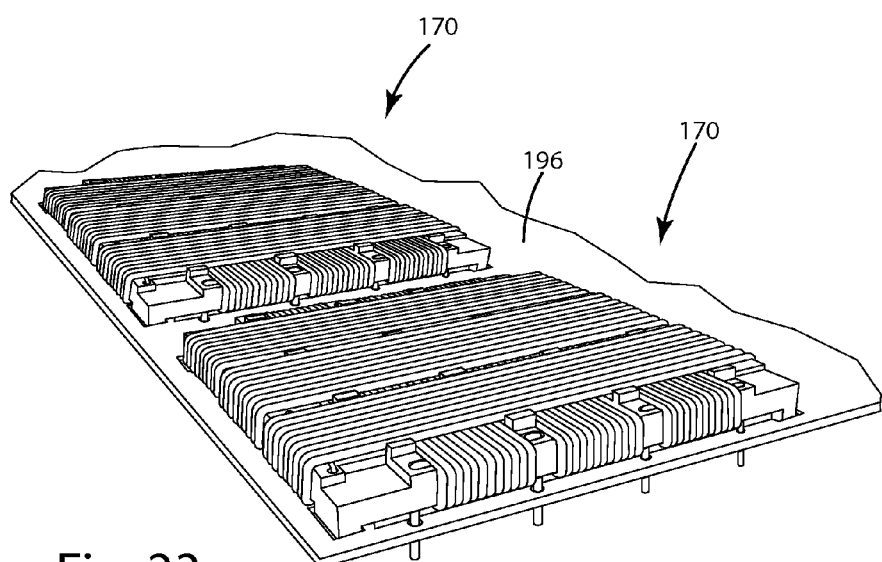
FIG. 23 is a perspective view of a printed circuit board including multiple primary coil arrays.

Optionally, each primary coil of the primary coil array 170 can be electrically connected to a driving circuit 108 as set forth above in connection with FIGS. 5A-5C. For example, each primary coil of the primary coil array 170 can be connected across +Vac and −Vac substantially as set forth above in connection with the primary coils 102 and 104 of FIGS. 5B-5C. The inverter 126 of FIGS. 5B-5C can be used to selectively energize the primary coils to search for one or more portable devices and to enhance power transfer between the primary coil 170 array and the one or more portable devices. As shown in FIGS. 21-23, the inverter 126 and the bobbin 172 can also be configured to support a second plurality of primary coils 198, 200, 202 generally orthogonal with respect to the first plurality of primary coils 184, 186, 188. At least two of the second plurality of coils can be selectively driven in opposite directions to provide a region of cumulative magnetic flux therebetween. This region of magnetic flux can optionally cooperate with a region of magnetic flux provided by the first plurality of coils. The combined region or zone of magnetic flux can be localized to coincide with an overlying secondary coil, thereby minimizing power losses through poorly coupled primary coils. Multiple primary coil arrays 170 can be conveniently applied to the printed circuit board 196 where a larger power transfer area is desired.

IV. Fourth Embodiment

In a fourth embodiment, a contactless power supply and method is provided for generating a field that transfers power to a secondary coil in an arbitrary location on a flat surface while maintaining a high coupling coefficient between primary and secondary coils. Multiple coils in conjunction, as described below, can effectively create a moveable flux-generating region with relatively high coupling coefficient to a secondary coil.

As shown in FIG. 22, the basic structure of the transfer side flux generator includes many coils of copper litz wire 182, 184, 186, 198, 200, 202 wound around a common NiZn ferrite core. All of the coils are constructed of similar gauge wire, for example 1 mm, are of a similar number of turns, for example 20 turns, and are wound in the same direction. The ferrite core is constructed in a way that it is considerably wider and longer than it is thick, in this case 53 mm×53 mm×2.5 mm. Beneath the coils is a layer of copper 194 (shown in FIG. 19) that serves to reduce stored energy. Each pair of coils operating in conjunction can be considered as an inductor with inductance $L_p$. If the combined inductor $L_p$ generates flux that is linked to a secondary inductor $L_s$, the coupling coefficient k can be defined according to the following formula:

$$k = M/\sqrt{L_p \cdot L_s}$$

with M being the mutual inductance between $L_p$ and $L_s$. Research has shown that k>0.25 can provide sufficient coupling for efficient power transfer. Particular primary coil pairs are energized such that the coil pair will have sufficient coupling and therefore sufficient spatial freedom over a region hence ensuring that the array has spatial freedom over that region.

Figure 24:
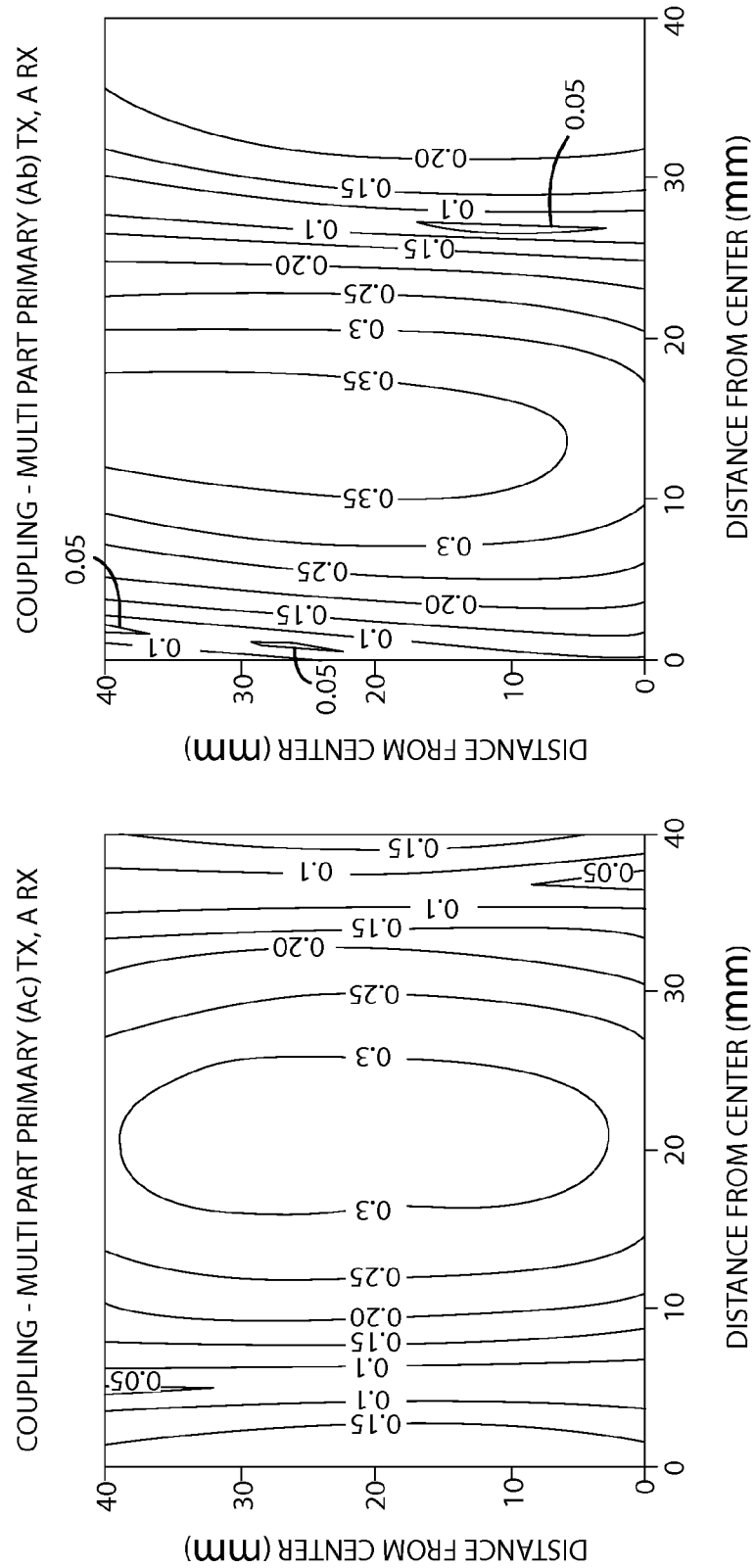
FIG. 24 are three-dimensional plots illustrating the coupling coefficient k between a secondary coil and a primary coil array.

This freedom was measured using a computer controlled system that mapped the position of the receiving coil $L_s$ at specific locations above the transmitting coil pair under test. It was determined to test the configuration where two adjacent coils where selected, as well as the configuration where two coils were selected with an unused coil in between, thus allowing an arbitrary number of coils to be similarly represented. In the case of an internal unused coil as shown at right in FIG. 24, the region of sufficient coupling overlap is greater than the gap between the two coils. In the case of adjacent coils as shown at left in FIG. 24, the region of sufficient coupling is wider than the width of a coil. By superposition, this can guarantee that there will be no position for a receiving coil $L_s$ that will not be in a region of sufficient coupling for any coil pair, ensuring sufficient spatial freedom over the region.

V. Fifth Embodiment

A contactless power supply in accordance with a fifth embodiment is illustrated in FIGS. 25-29 and generally designated 200. The contactless power supply 200 includes a driving circuit 210 and a primary coil array 250. As set forth in connection with the above embodiments, the driving circuit 210 can selectively energize two or more primary coils of the primary coil array 250 to provide a magnetic flux in a region occupied by a portable device. In addition, the driving circuit 210 can also correct for a divergence in current among energized primary coils and/or can purposely drive the primary coils with substantially non-identical currents.

In particular, the driving circuit 210 of the present embodiment is adapted to detect and correct an "imbalanced" current among energized primary coils. In normal operation, the driving circuit 210 can energize two or more primary coils with substantially identical time-varying driving currents. In instances where the primary coils are wound in the same direction, the driving currents can be substantially 180 degrees out of phase. In instances where the primary coils are wound in opposite directions or counter-wound, the driving currents can be substantially in phase. However, the current in the energized primary coils can diverge and become dissimilar, generally referred to herein as an imbalanced current condition.

An imbalanced current condition can be caused by a variety of factors. For example, an imbalanced current condition can be caused by a portable device being closer to one energized primary coil than another energized primary coil. That is, a portable device can have a first coupling coefficient relative a first energized primary coil and a second coupling coefficient relative to a second energized primary coil. As a result, the reflected impedance in each primary coil will normally be different, resulting a divergence from substantially identical current values to dissimilar current values (e.g., a lesser or greater amplitude or RMS current). In other applications, an imbalanced current condition can be caused by physical and/or material variations in the construction of the primary coil array, including the primary coils and an optional core, for example. In still other applications, an imbalanced current condition can be desirable, and the driving circuit 210 can purposely drive the primary coils with substantially non-identical currents.

Figure 25:
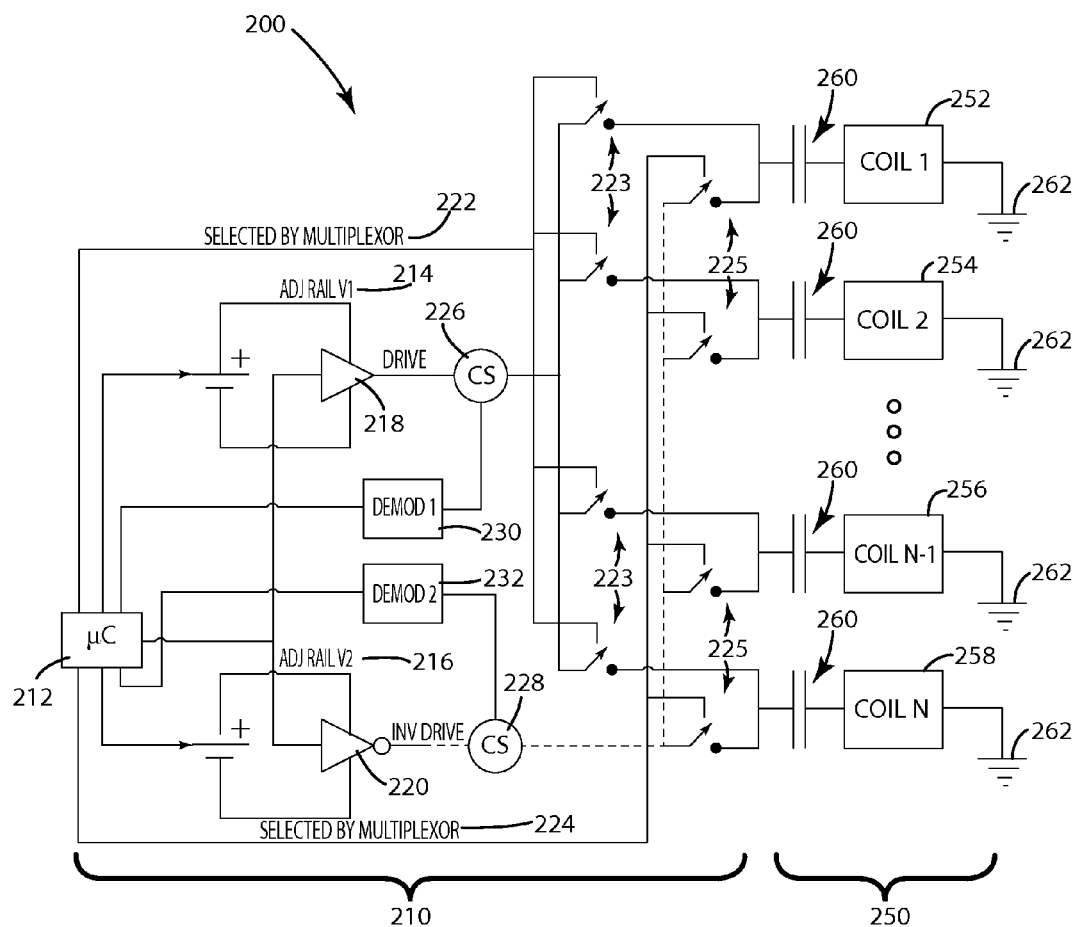
FIG. 25 is a circuit diagram illustrating a contactless power supply adapted to correct an imbalanced current condition among energized primary coils.
Figure 26:
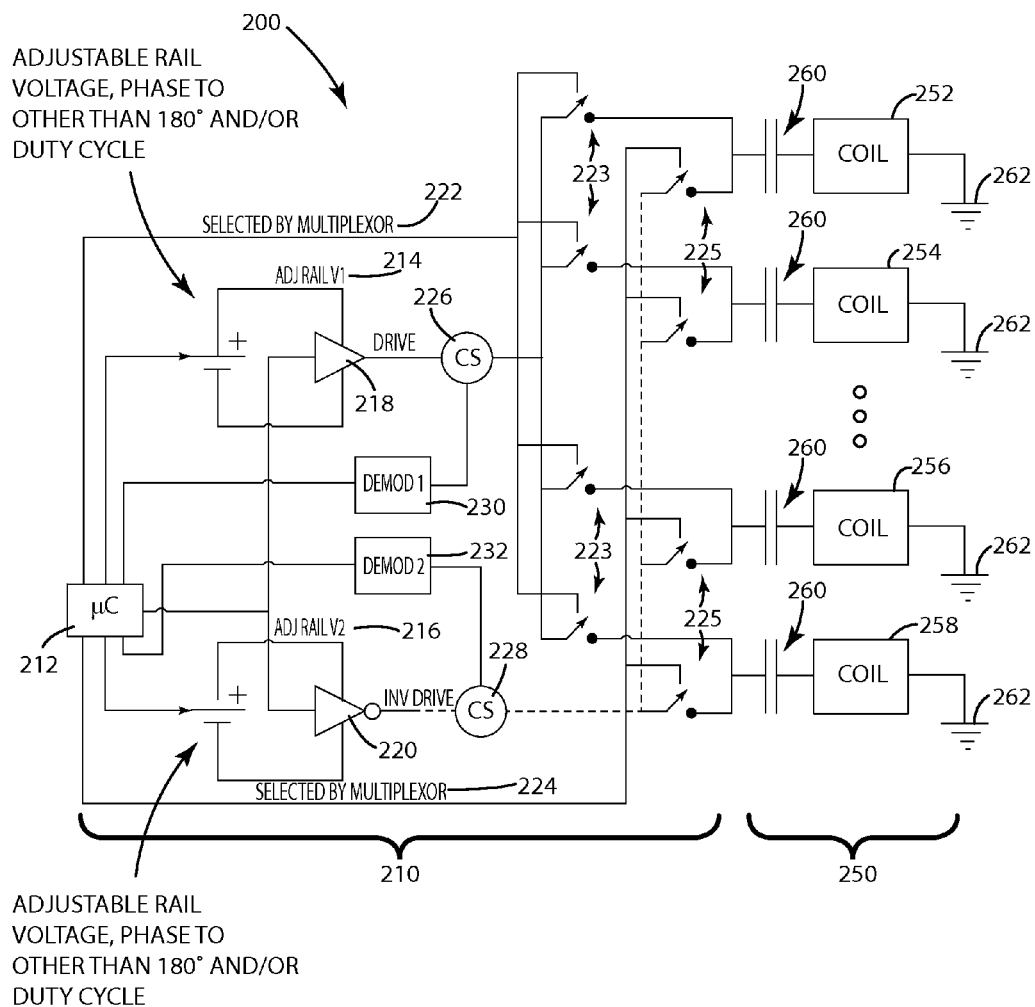
FIG. 26 is the circuit diagram of FIG. 25 illustrating an adjustable rail voltage, phase and duty cycle.

The driving circuit 210 of the present embodiment can correct an imbalanced current condition—or purposely drive to an imbalanced current condition—in a number of ways. For example, the driving circuit 210 can adjust the rail voltage, the phase lag, the duty cycle, the driving frequency, or the impedance among energized primary coils. Referring now to FIGS. 25-26, a driving circuit 210 is shown and is generally adapted to detect and correct an imbalanced current condition by adjusting the rail voltage among energized primary coils. The driving circuit 210 includes a microcontroller 212, a first adjustable rail voltage 214 and a second adjustable rail voltage 216. The microcontroller 212 is electrically coupled to each rail voltage 214, 216 to control the rail voltage output. The first rail voltage output is electrically connected to a first microcontroller-controlled driver 218, and the second rail voltage output is electrically connected to a second microcontroller-controlled driver 220. The first and second drivers 218, 220 generate respective time-varying driving currents that are approximately 180 degrees out of phase. For example, if the first microcontroller-controlled driver 218 generates a series of square wave pulses of a given frequency, the second microcontroller-controlled driver 220 can generate a corresponding series of square wave pulses of the same frequency, but 180 degrees out of phase. Because the second driver 220 modulates the second adjustable rail voltage, the second driver output can have an amplitude different from the amplitude of the first driver output. For example, second driver output can have an RMS current less than or greater than the RMS current of the first driver output, with the difference being proportional to the difference between the first adjustable rail voltage 214 and the second adjustable rail voltage 216.

As also shown in FIGS. 25-26, the output of the first and second drivers 218, 220 can each be connected to one or more primary coils in the primary coil array 250 through one or more multiplexers 222, 224. In the illustrated embodiment, first and second multiplexers 222, 224 are microcontroller-controlled to select the one or more primary coils that receive the output of the first driver 218 and the second driver 220. For example, the first multiplexer 222 includes a single input (i.e., the output of the first driver 218) and includes n number of outputs corresponding to n number of primary coils in the primary coil array 250. In like manner, the second multiplexer 224 includes a single input (i.e., the output of the second driver 220) and includes n number of outputs corresponding to n number of primary coils in the primary coil array 250. Each multiplexer 222, 224 includes n number of microcontroller-controlled switches 223, 225, for example FETs, to control the current path between the drivers 218, 220 and the primary coil array 250. First and second current sensors 228 are electrically connected between the first and second drivers 218, 220 and the first and second multiplexers 222, 224, respectively. The output of each current sensor 226, 228 is electrically connected to the microcontroller 212, optionally through first and second demodulators 230, 232. In the illustrated embodiment, each primary coil in the primary coil array 250 includes a series connected capacitor 260, and is individually connected to ground 262. In addition, the primary coil windings are generally wound in the same direction about a common axis. For example, the primary coil windings can be wound about a common core 172 as set forth above in connection with FIGS. 16-23.

In operation, the driving circuit 210 can drive the primary coil array 250 substantially as set forth above to locate one or more portable devices and to energize only those primary coils that are closely coupled with the located portable device and to provide a cooperative magnetic flux in the region occupied by the portable device. The first and second current sensors 226, 228 can then monitor the current in each of the energized primary coils, the output of which is fed to the microcontroller 212. If, for example, the microcontroller 212 determines the coil driven by the first driver 218 (the "first" primary coil) is conducting sufficiently less current than the coil driven by the second driver 220 (the "second" primary coil), the first primary coil can be driven with an enhanced driving current to offset this deficiency. For example, the microcontroller 212 can increase the first rail voltage 216, or the microcontroller 212 can decrease the second rail voltage 214. Throughout this process, the driving frequency of the first driver 218 can remain tied to the second driver 220, such that only the amplitude and the phase of each driver output will differ from each other. The driving circuit 210 can continually or periodically monitor the current difference among energized coils, optionally comparing this difference with a threshold value stored in memory. As the current difference exceeds the threshold value, the driving circuit 210 can increase or decrease the current in one of the two or more primary coils to offset this difference substantially as set forth above.

Figure 27:
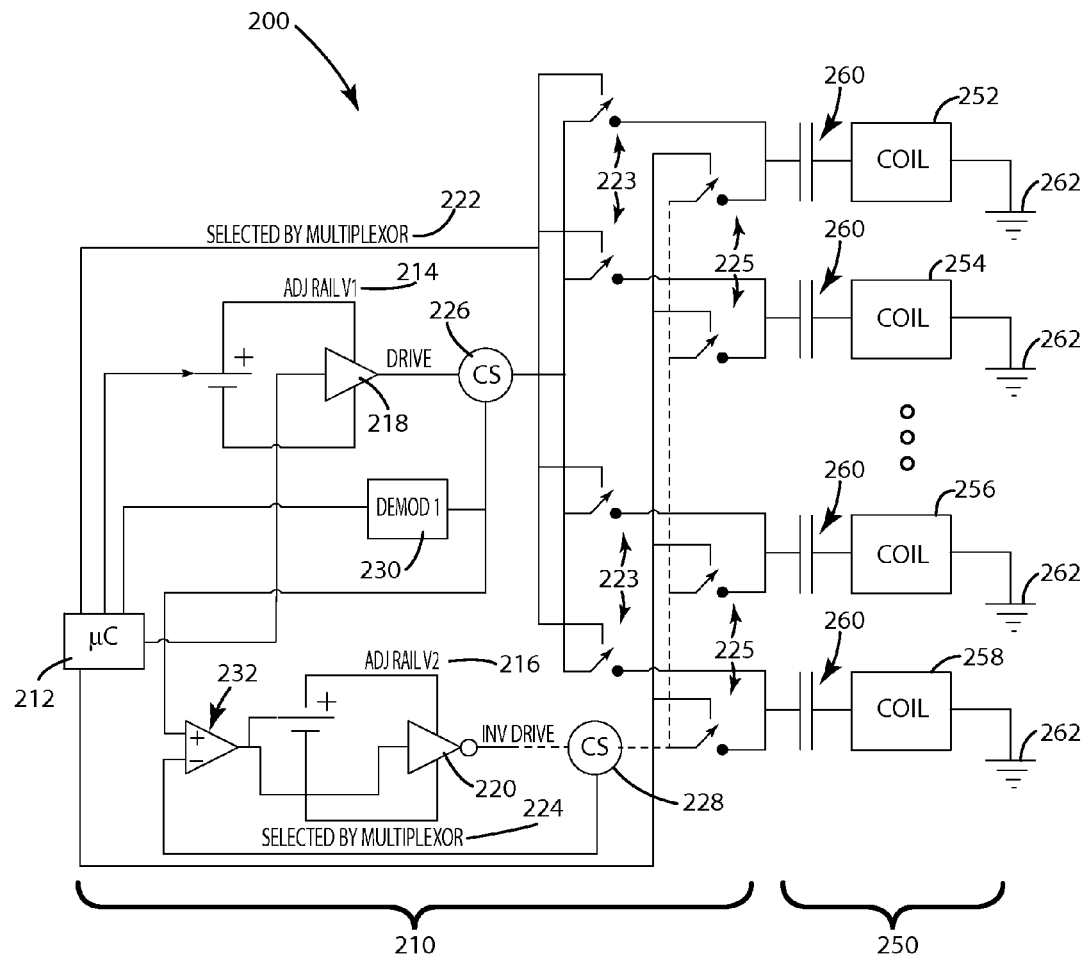
FIG. 27 is a circuit diagram illustrating a contactless power supply including an analog circuit to detect an imbalanced current condition.

As optionally shown in FIG. 27, the output of the first and second current sensors 226, 228 can be evaluated by an analog circuit, for example a differential amplifier 232, rather than by the microcontroller 212. For example, the analog amplifier 232 can include the output of the first current sensor 226 as its non-inverted input, and can include the output of the second current sensor 228 as its inverted input. The amplifier output can be proportional to the difference between the non-inverted input and the inverted input, as set by the amplifier gain. This output can be utilized to control the second adjustable rail voltage 216. For example, as the amplifier output increases, indicating an appreciable increase of the first current sensor output over the second current sensor output, the second rail voltage 216 can also increase to offset the current deficiency in the second primary coil. The second driver 220 can be driven based on the output of the amplifier 232 as shown in FIG. 27, or can be driven by the microcontroller 212 as shown in FIGS. 25-26. Thus, the analog amplifier 232, or other analog circuit, can be utilized to differentially compare the current in the energized primary coils. In addition, the output of the analog amplifier 232 can control a phase delay line or a deadband generator, for example.

To reiterate, each primary coil of the primary coil array 250 will generally have its own reflected impedance when proximate a portable device. This reflected impedance, and the corresponding change in driving current, is presented to rail when a corresponding multiplexer FET is closed. The current at each primary coil may also vary based on factors other than its reflected impedance, including for example the driving frequency and variations in the construction of the primary coil array. As noted above in connection with FIGS. 25-26, the driving circuit 210 can correct for an imbalanced current condition by modulating a rail voltage. In addition to modulating a rail voltage, the driving circuit 210 can correct for an imbalanced current condition in a variety of other respects. For example, the driving circuit 210 can vary the duty cycle of the drivers 218, 220. That is, increasing the duty cycle of the first driver 218 can have a similar effect as increasing the first adjustable rail voltage 214. In like manner, increasing the duty cycle of the second driver 220 can have a similar effect as increasing the second adjustable rail voltage 216. The power supply can also correct for an imbalanced current condition by varying the phase lag between the drivers 218, 220, or by selectively varying the impedance of each primary coil using an array of selectable impedance elements and/or using one or more tunable impedance elements connected in parallel and/or series with a primary coil.

Figure 28:
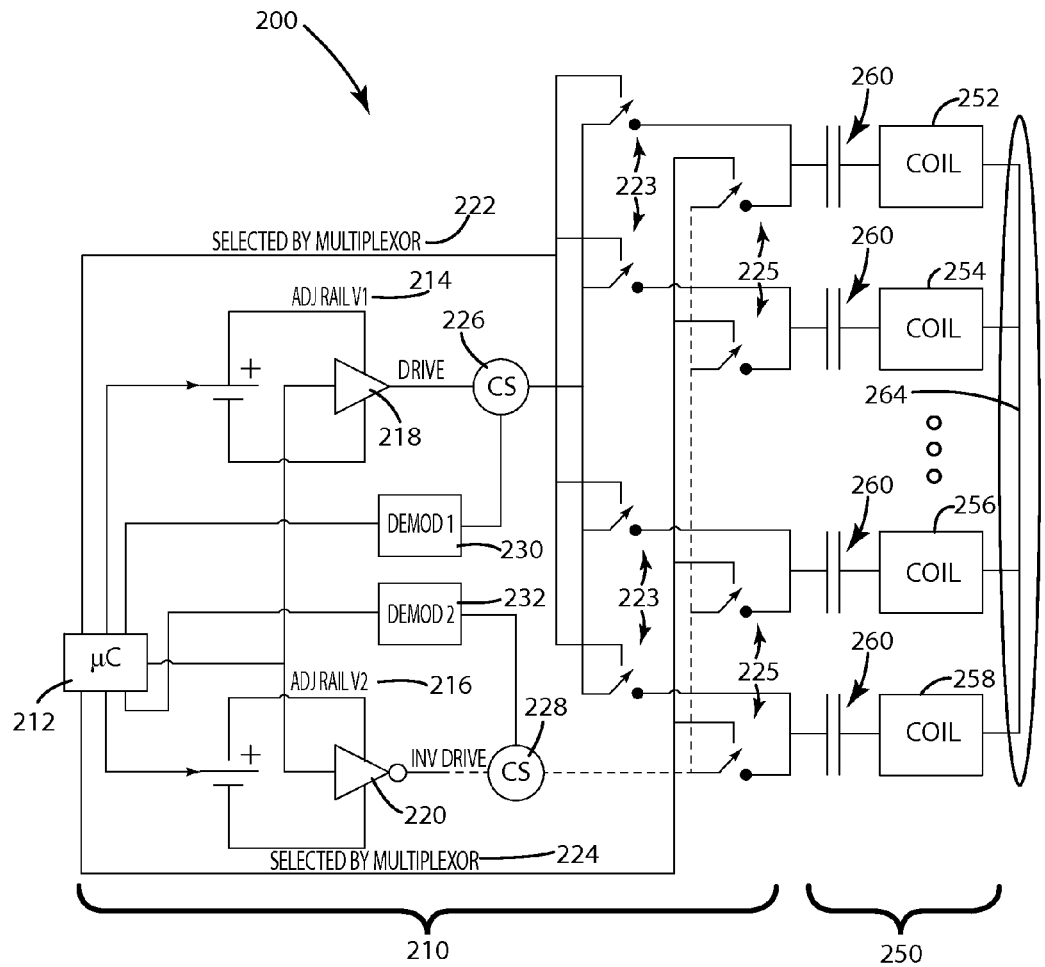
FIG. 28 is a circuit diagram of a contactless power supply including primary coils connected across a common node.

As further optionally shown in FIG. 28, the primary coil array 250 can be driven by the driving circuit 210 in a push-pull sequence, with the energized primary coils being connected in series through a common node 264. In this configuration, the current is generally balanced among first and second energized primary coils. For example, the first multiplexer 222 can direct the first driver output to coil 256, and the second multiplexer 224 can direct the second driver output to coil 258. Because coils 256 and 258 are connected across a common node 264, the current in coil 256 at time $t_0$ is generally the same as the current in coil 258 at time $t_0$, and the output of each current sensor 226, 228 will also generally be the same. Although the current sensors 226, 228 are generally not utilized to detect a current imbalance, the current sensors 226, 228 can instead be utilized in conjunction with a scan for a portable device in proximity to the primary coil array 250 substantially as set forth above. In addition, the rail voltages 214, 216 can be substantially equal to each other, or one rail voltage can at times be greater than the other rail voltage. For example, the first driver 218 can generate a train of driving pulses, and the second driver 220 can generate an inverted train of driving pulses at substantially the same frequency but approximately 180 degrees out of phase. In instances where the rail voltages 214, 216 are not equal, the average current through the energized primary coils will be greater in one direction than in the other direction. The energized coils 256, 258 can be wound in a common direction about a common core to provide a region of cooperative magnetic flux therebetween. Optionally, one or more additional switches can selectively isolate the primary coils from the common node 264 under the control of the microcontroller 212.

Figure 29:
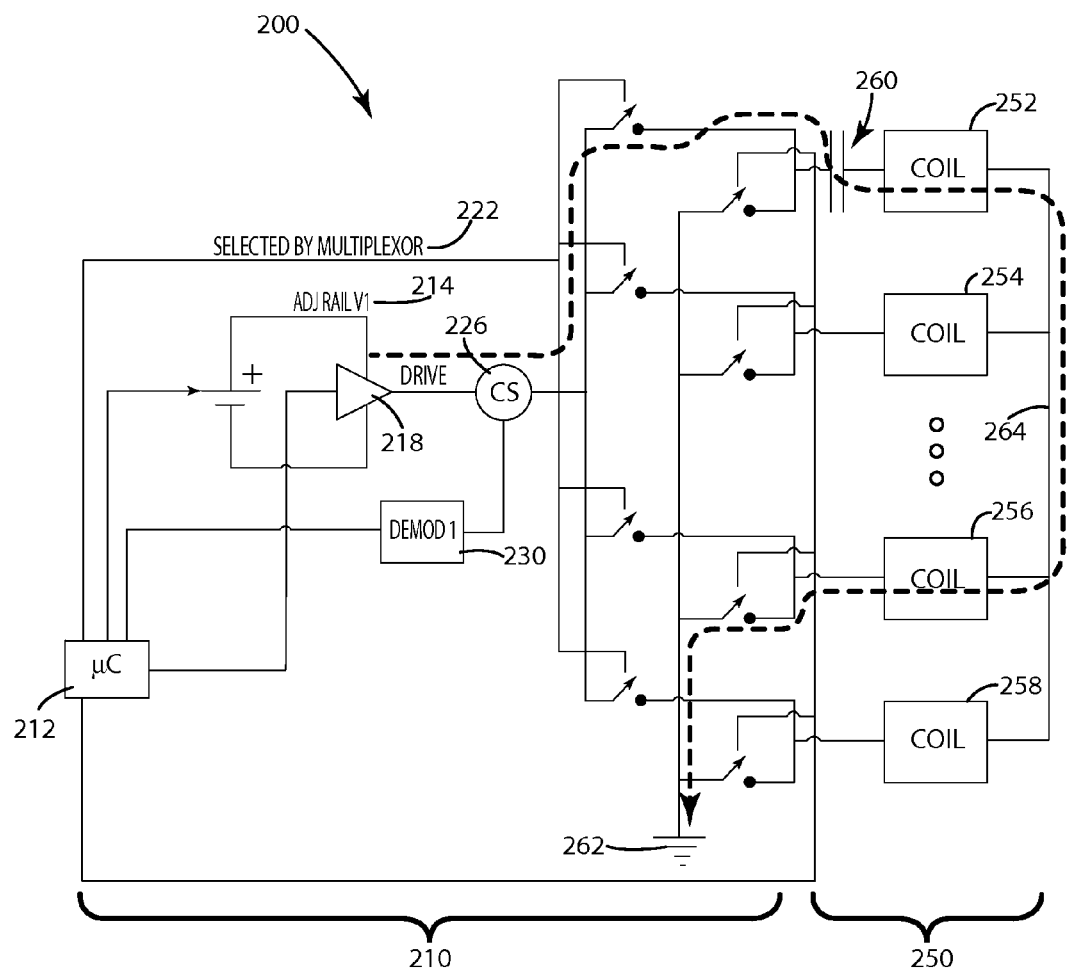
FIG. 29 is a circuit diagram of a contactless power supply include a single adjustable rail voltage and primary coils connected across a common node.

As also shown in FIG. 29, the primary coil array 250 can instead be driven by only a single microcontroller-controller driver 218. In this configuration, the primary coils 252, 254, 256, 258 are again connected in series across a common node 264. The first multiplexer 222 includes an array of parallel connected switches 223 to selectively drive a first primary coil with a time-varying driving current. The second multiplexer 224 includes a counterpart array of parallel connected switches 225 to selectively connect a second primary coil to ground. For example, the first multiplexer 222 can drive the first primary coil 252 with the driver output, and the second multiplexer 224 can electrically connect the second primary coil 254 to ground while also isolating the remaining primary coils from ground. The current flow path is shown in as originating from the driver 218 and continuing through the first primary coil 252 and the second primary coil 256 to ground. The energized coils 252, 256 can be wound in a common direction about a common core to provide a region of cooperative magnetic flux therebetween. In addition, each primary coil 252, 256 can include a series resonant capacitor 260, and in some instances fewer than each primary coil can include a series resonant capacitor 260. For example, only the first primary coil 252 is shown in FIG. 29 as including a series resonant capacitor 260.

The contactless power supply 200 is described above as generally balancing the current among concurrently energized primary coils. In some embodiments, however, it can be desirable to purposely drive the primary coils with different current values. For example, it can be desirable to control the primary coil array 250 so that the energized primary coil that is closest to the portable device has more current. This would, in effect, shift the region of peak flux linkage (and therefore coupling and efficiency) to be centered at the location of the portable device. In this case, the driving circuit 210 can control the first and second drivers in FIGS. 25-27 to proportionally (instead of equally) distribute the current among the energized primary coils. The error between the current sensor outputs can also be used to discern additional information. For example, the error between the current sensor outputs can indicate that a parasitic object could be closer to one primary coil than another primary coil. This information could then be used to stop power transfer, or to potentially shift to powering a different pair of primary coils that may move the region of cooperative magnetic away from the parasitic object. If the coils are, in fact, driven in series as shown in FIGS. 28-29, then the relative voltage across the energized primary coils could provide similar information.

The above descriptions are those of the current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A contactless power supply for providing power to at least one remote device, comprising:
 a primary coil array including more than two inductive primaries;
 a driving circuit adapted to selectively drive a first inductive primary of the primary coil array and a second inductive primary of the primary coil array,
 wherein the first inductive primary provides an electromagnetic flux when driven with a first time-varying current, the first inductive primary defining a first centerline axis;
 wherein the second inductive primary provides an electromagnetic flux when driven with a second time-varying current, the second inductive primary defining a second centerline axis coaxial with the first centerline axis; and
 a power transfer surface to receive the at least one remote device thereon, wherein the first and second inductive primaries are subjacent the power transfer surface and wherein the first and second centerline axes are generally parallel to the power transfer surface, the first and second inductive primaries being operable to define a cumulative magnetic flux in a region of the power transfer surface between the first and second inductive primaries.

2. The contactless power supply of claim 1 wherein the first inductive primary is wound about a first direction and the second inductive primary is wound about a second direction different from the first direction.

3. The contactless power supply of claim 2 wherein the first and second inductive primaries are electrically coupled in series whereby the first and second time-varying currents are equal.

4. The contactless power supply of claim 1 further including:
 a first driver electrically coupled to the first inductive primary to generate the first time-varying current; and
 a second driver electrically coupled to the second inductive primary to generate the second time-varying current, wherein the first and second time-varying currents are substantially out of phase.

5. The contactless power supply of claim 1 further including a ferromagnetic a core element, wherein the first and second inductive primaries are wound about the ferromagnetic core element.

6. The contactless power supply of claim 1 further including a diamagnetic element opposite the power transfer surface, wherein the first and second inductive primaries are positioned therebetween.

7. The contactless power supply of claim 1 further including a bobbin including first and second channels, wherein the first and second inductive primaries are wound about the bobbin within the first and second channels, respectively.

8. The contactless power supply of claim 7 wherein the bobbin is planar.

9. The contactless power supply of claim 1 further including third and fourth coaxial inductive primaries that are orthogonal to the first and second coaxial inductive primaries.

10. The contactless power supply of claim 1 wherein:
 the at least one remote device is positionable along a plurality of locations on the power transfer surface; and
 the at least one remote device includes an inductive secondary generally orthogonal to the first and second inductive primaries.

11. A method for providing wireless power to a remote device, comprising:
 providing a contactless power supply including:
 a power transfer surface to receive the remote device thereon, and a primary coil array subjacent the power transfer surface and including more than two horizontally disposed inductive primaries; and driving first and second inductive primaries of the primary coil array with respective time-varying currents to provide the remote device with a first cumulative magnetic flux in a region between the first and second inductive primaries of the primary coil array, wherein the first inductive primary provides an electromagnetic flux when driven with a first time-varying current, the first inductive primary defining a first centerline axis;

wherein the second inductive primary provides an electromagnetic flux when driven with a second time-varying current, the second inductive primary defining a second centerline axis coaxial with the first centerline axis.

12. The method according to claim 11 further including:
measuring a current or a voltage in the first and second inductive primaries; and
driving the first and second inductive primaries to a balanced condition in which the current or the voltage in each of the first and second inductive primaries is substantially equal.

13. The method according to claim 12 wherein driving to a balanced condition includes varying one of the amplitude, the duty cycle, and the frequency of the time-varying current in one of the first and second inductive primaries.

14. The method according to claim 11 further including:
measuring a current or a voltage in the first and second inductive primaries; and
driving the first and second inductive primaries to an imbalanced condition in which the current or the voltage in each of the first and second inductive primaries is substantially dissimilar.

15. The method according to claim 14 wherein driving to an imbalanced condition includes varying one of the amplitude, the duty cycle, and the frequency of the time-varying current in one of the first and second inductive primaries.

16. The method according to claim 11 wherein the driving step includes:
driving the first inductive primary with a first time-varying current;
driving the second inductive primary with a second time-varying current;
varying the phase in at least one of the first and second time-varying currents to control the first cumulative magnetic flux provided to the remote device.

17. The method according to claim 11 wherein:
the first and second inductive primaries are wound in the same direction about the first axis; and
the respective time-varying currents are substantially out of phase.

18. The method according to claim 11 wherein the first inductive primary is wound in a first direction about the first axis and the second inductive primary is wound in a second direction about the first axis.

19. The method according to claim 11 further including:
providing a second plurality of inductive primaries wound about a second axis generally perpendicular to the first axis; and
driving first and second ones of the second plurality of inductive primaries with respective time varying currents to generate a second cumulative magnetic flux in the region occupied by the remote device.

20. The method according to claim 19 further including providing a power transfer surface for receipt of the remote device thereon, the first and second plurality of inductive primaries being subjacent the power transfer surface.

21. The method according to claim 11 wherein the respective time-varying currents include a first amplitude and a second amplitude different from the first amplitude.

22. A contactless power supply system comprising:
a remote device including an inductive secondary; and
a contactless power supply including:
a power transfer surface to receive the remote device thereon,
a primary coil array including more than two inductive primaries subjacent the power transfer surface and defining a centerline axis generally parallel to the power transfer surface, and
a driving circuit adapted to selectively drive a first inductive primary of the primary coil array and a second inductive primary of the primary coil array,
wherein the inductive secondary is orthogonal to the first and second inductive primaries, and wherein the first and second inductive primaries are operable to generate a cumulative magnetic flux in the region of the power transfer surface occupied by the orthogonal inductive secondary.

23. The contactless power supply system of claim 22 wherein the first inductive primary is wound about a first direction and the second inductive primary is wound about a second direction different from the first direction.

24. The contactless power supply system of claim 23 wherein the first and second inductive primaries are electrically coupled in series.

25. The contactless power supply system of claim 22 further including:
a first driver electrically coupled to the first inductive primary to generate the first time-varying current; and
a second driver electrically coupled to the second inductive primary to generate the second time-varying current, wherein the first and second time-varying currents are substantially out of phase.

26. The contactless power supply system of claim 22 further including a ferromagnetic a core element, wherein the first and second inductive primaries are wound about the ferromagnetic core element and wherein the ferromagnetic core element guides the cumulative magnetic flux toward the region of the power transfer surface occupied by the inductive secondary.

27. The contactless power supply system of claim 22 further including a diamagnetic element subjacent the first and second inductive primaries to increase the cumulative magnetic flux in the region of the power transfer surface occupied by the inductive secondary.

28. The contactless power supply system of claim 27 wherein the diamagnetic element is planar and is coextensive with the power transfer surface, the first and second inductive primaries being positioned between the diamagnetic element and the power transfer surface.

29. The contactless power supply system of claim 22 further including a planar bobbin, wherein the first and second inductive primaries are wound about the planar bobbin.

30. A method for providing wireless power to a remote device including an inductive secondary, the method comprising:
providing a power transfer surface to receive the remote device thereon;
providing a first primary coil array subjacent the power transfer surface and including more than two spaced-apart inductive primaries wound about a first centerline axis, the first centerline axis being generally parallel to the power transfer surface;

driving a first inductive primary of the first primary coil array with a current in a first direction; and driving a second inductive primary of the first primary coil array with a current in a second direction, wherein the inductive secondary is generally orthogonal to the first and second inductive primaries of the first primary coil array, and wherein the first and second inductive primaries of the first primary coil array are generally tangentially aligned with the inductive secondary to provide a cumulative magnetic flux to the inductive secondary.

31. The method according to claim 30 further including:
providing a second primary coil array subjacent the power transfer surface and including more than two spaced-apart inductive primaries wound about a second centerline axis generally orthogonal to the first centerline axis;

driving a first inductive primary of the second primary coil array with a current in a first direction; and driving a second inductive primary of the second primary coil array with a current in a second direction, wherein the first and second inductive primaries of the second primary coil array are tangentially aligned with the inductive secondary to contribute to the cumulative magnetic flux to the inductive secondary.

32. The method according to claim 30 further including monitoring a characteristic of power in the first and second inductive primaries of the first primary coil array to detect the presence of the inductive secondary in proximity to the first and second inductive primaries.

33. The method according to claim 32 wherein the characteristic of power includes at least one of current, voltage and phase.

34. The method according to claim 30 wherein the first primary coil array includes a ferromagnetic core element.

35. The method according to claim 30 wherein the first primary coil array includes a planar bobbin.

36. The method according to claim 30 wherein the inductive secondary is substantially orthogonal to the first primary coil array.

37. The method according to claim 30 wherein the power transfer surface is planar and removably receives the remote device thereon.

* * * * *